(12) United States Patent
Galgon et al.

(10) Patent No.: US 8,992,776 B2
(45) Date of Patent: Mar. 31, 2015

(54) METHODS FOR TREATING WASTE WATER

(71) Applicant: Kinder Morgan Operating L.P."C", Houston, TX (US)

(72) Inventors: Randy A. Galgon, Nuremberg, PA (US); Allen Ray Stickney, Port Rowan (CA); Richard B. Steinberg, League City, TX (US)

( * ) Notice: Subject to any disclaimer, the term of this patent is extended or adjusted under 35 U.S.C. 154(b) by 0 days.

(21) Appl. No.: 14/032,639

(22) Filed: Sep. 20, 2013

(65) Prior Publication Data

US 2014/0083938 A1 Mar. 27, 2014

Related U.S. Application Data

(62) Division of application No. 12/854,855, filed on Aug. 11, 2010, now Pat. No. 8,557,117.

(60) Provisional application No. 61/232,850, filed on Aug. 11, 2009, provisional application No. 61/232,861, filed on Aug. 11, 2009, provisional application No. 61/352,724, filed on Jun. 8, 2010.

(51) Int. Cl.
*C02F 3/00* (2006.01)
*C02F 3/28* (2006.01)
*C02F 3/08* (2006.01)
*C02F 3/30* (2006.01)

(52) U.S. Cl.
CPC ............... *C02F 3/286* (2013.01); *C02F 3/006* (2013.01); *C02F 3/082* (2013.01); *C02F 3/302* (2013.01); *C02F 3/305* (2013.01); *C02F 3/2833* (2013.01); *Y10S 210/903* (2013.01)
USPC ........... 210/610; 210/615; 210/616; 210/620; 210/621; 210/903

(58) Field of Classification Search
USPC ................. 210/610, 615–616, 620–621, 903
See application file for complete search history.

(56) References Cited

U.S. PATENT DOCUMENTS

2008/0215390 A1* 9/2008 Gipps et al. .................. 705/7

* cited by examiner

*Primary Examiner* — Chester Barry
(74) *Attorney, Agent, or Firm* — Robert W Strozier

(57) ABSTRACT

A system of treating high nitrogen content waste water is disclosed, where the system includes a precipitation and conditioning subsystem, an ammonia stripper subsystem, and a denitrification subsystem. The system is adapted to reduce nitrogen contamination to level below about 10 ppm and in certain embodiments below 3 ppm.

9 Claims, 28 Drawing Sheets

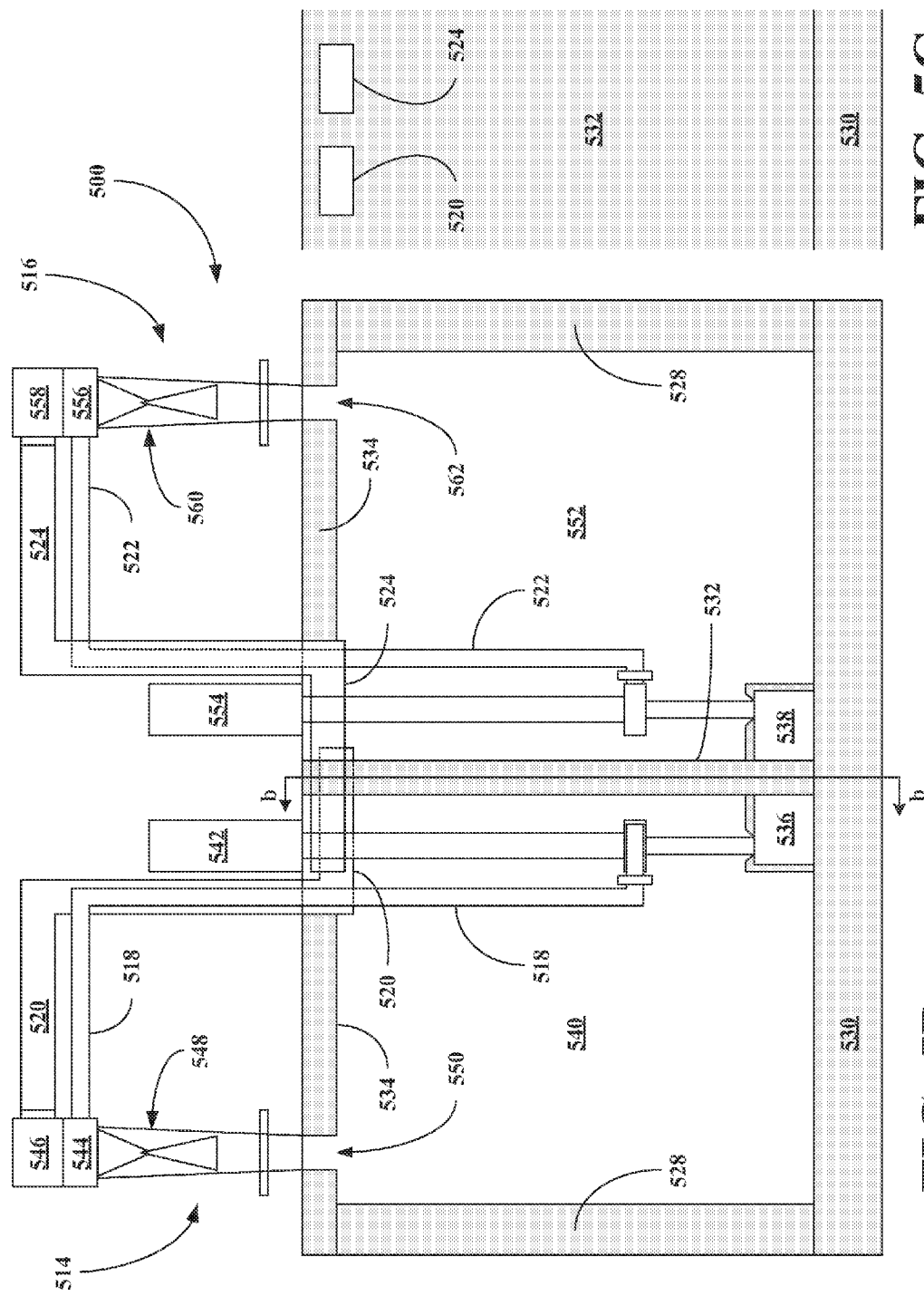

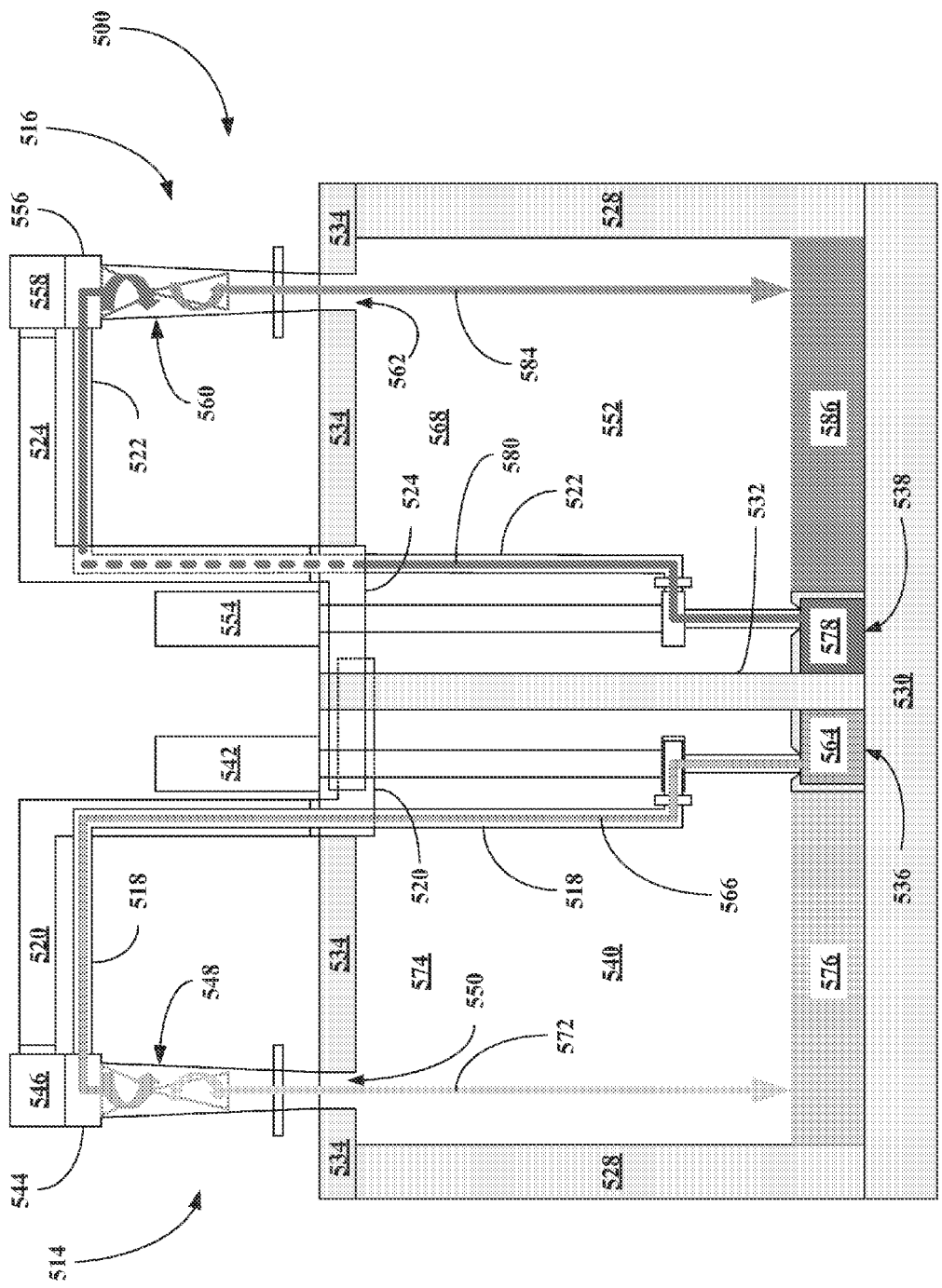

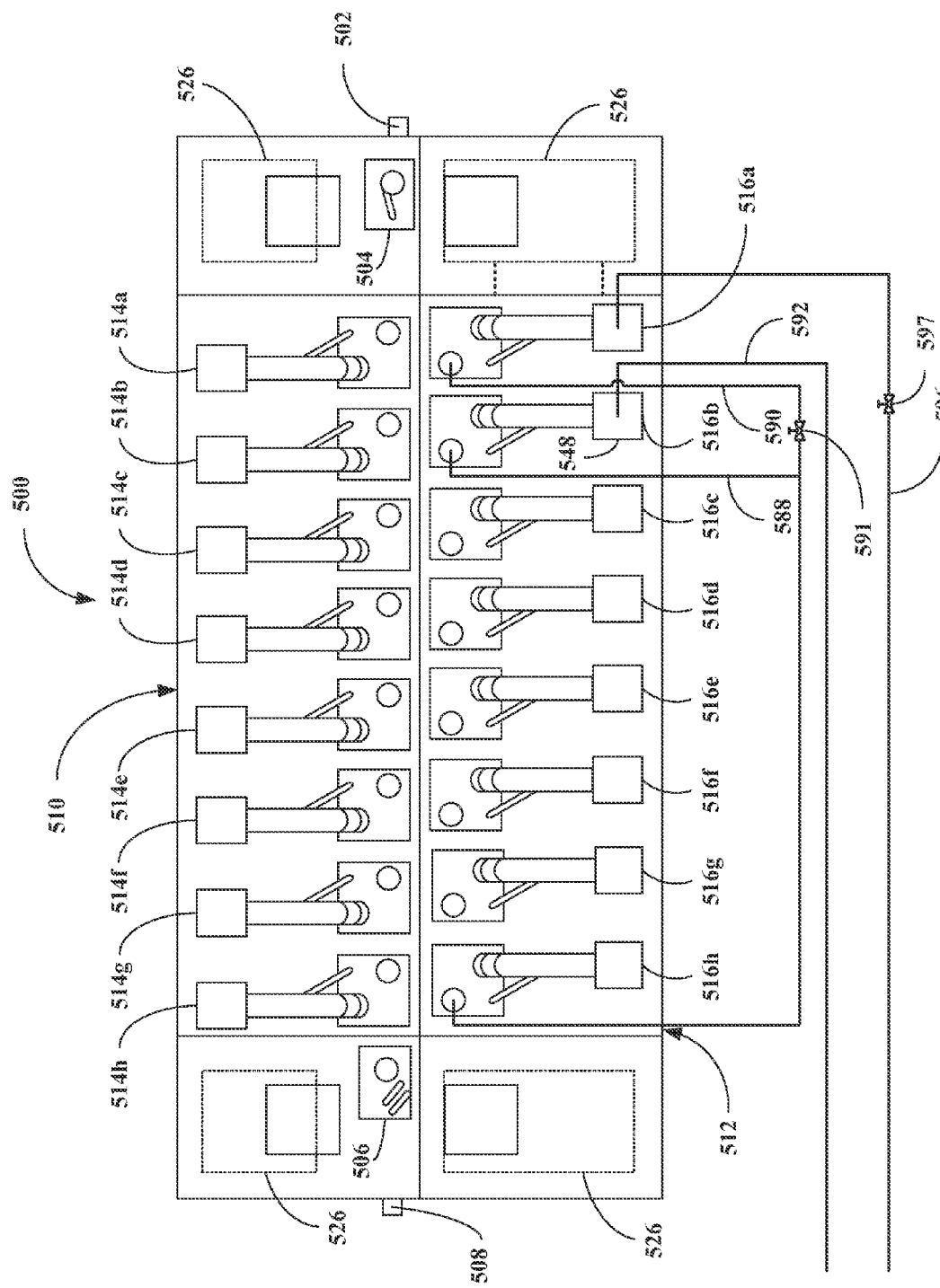

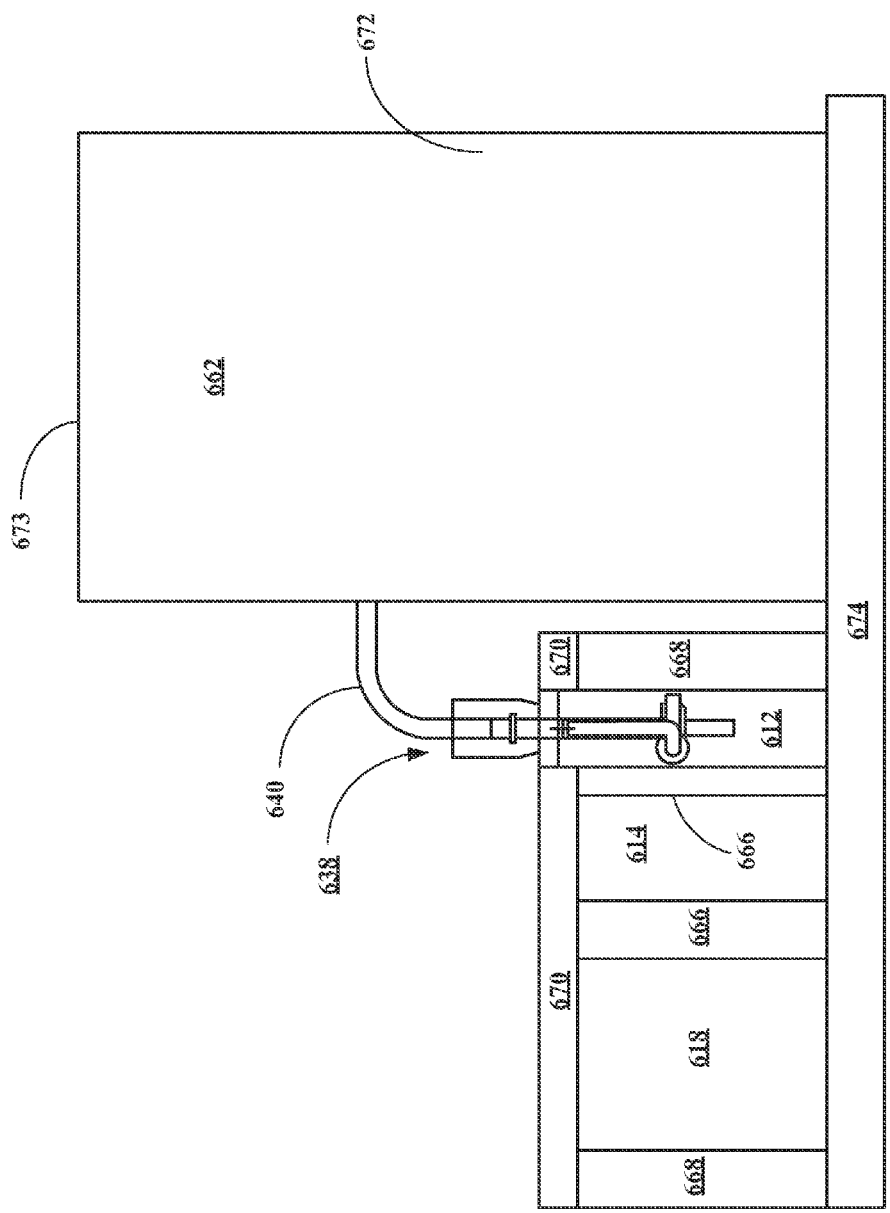

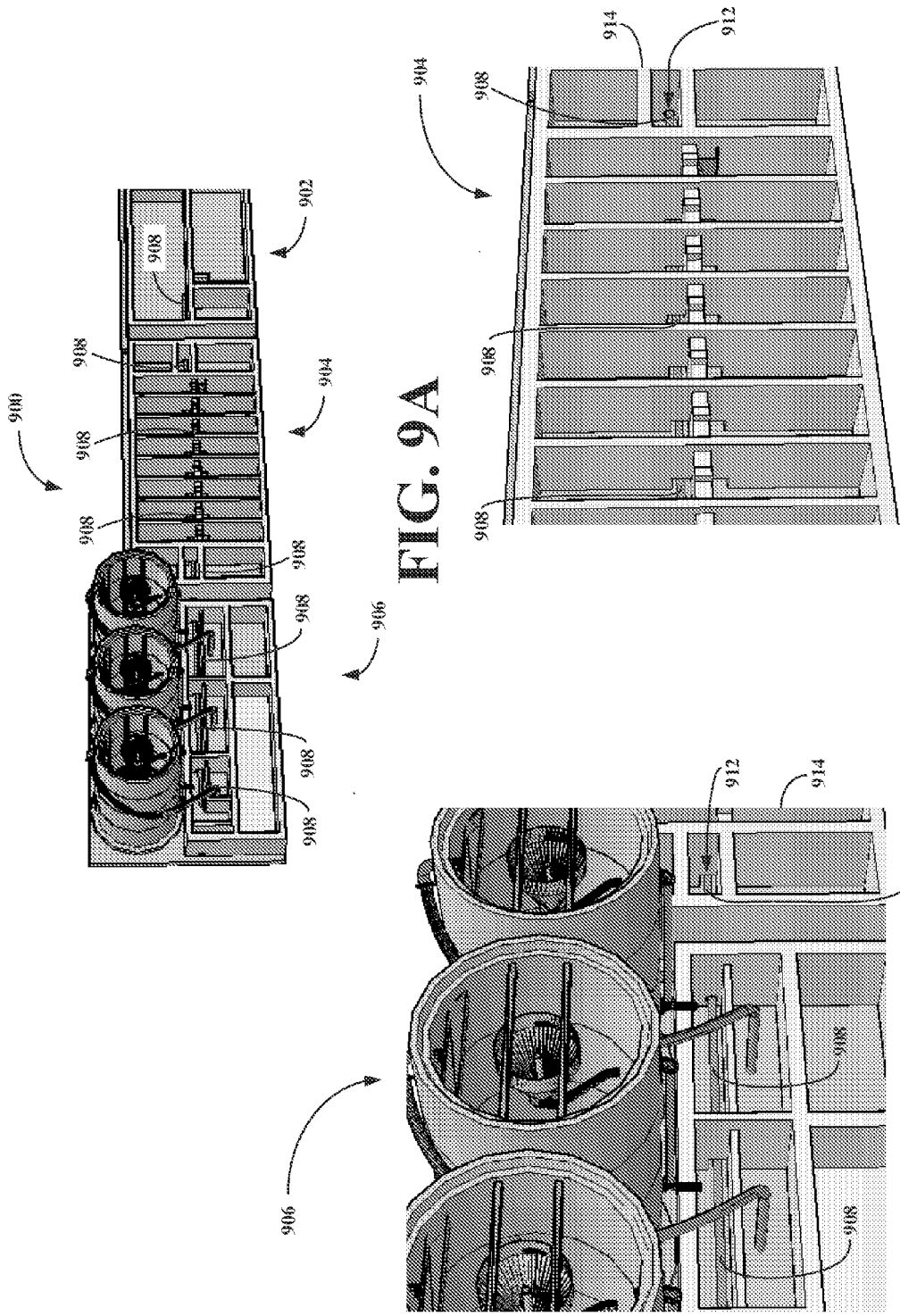

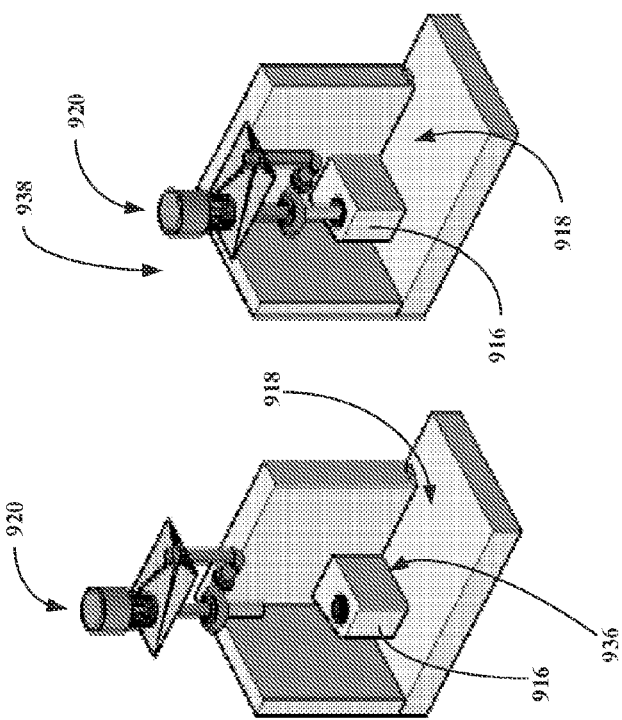
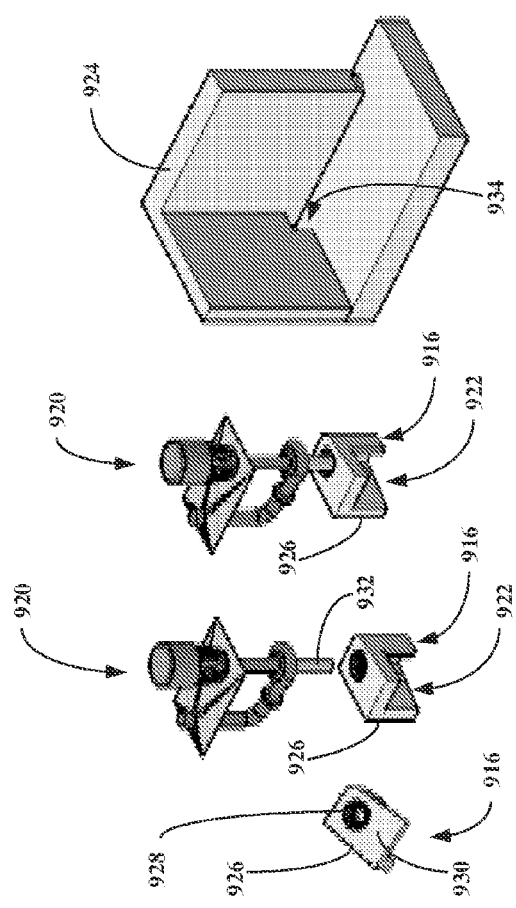
FIG. 9D   FIG. 9E   FIG. 9F   FIG. 9G

METHODS FOR TREATING WASTE WATER

RELATED APPLICATIONS

This application is a divisional or continuation or U.S. patent application Ser. No. 12/854,855 filed Aug. 11, 2010, now U.S. Pat. No. 8,557,117, which claims the benefit of and priority to U.S. Provisional Application Nos. 61/232,850, filed 11 Aug. 2009, 61/232,861, filed 11 Aug. 2009 and 61/352,724, filed 8 Jun. 2010.

BACKGROUND OF THE INVENTION

1. Field of the Invention

Embodiments of the present invention relate to systems, apparatuses and methods for treating waste water including high concentrations of nitrogen contaminants. The waste water can include other contaminants in addition to nitrogen contaminants.

Embodiments of the present invention relate to systems, apparatuses and methods for treating waste water including high concentrations of nitrogen contaminants, where the system includes three subsystem arranged in series: 1) a precipitation and conditioning subsystem, 2) an ammonia stripper subsystem, and 3) a denitrification subsystem. The system is adapted to reduce nitrogen contamination to a level below about 10 ppm and in certain embodiments below 3 ppm and in other embodiments, to a level below about 1 ppm.

2. Description of the Related Art

There are various types of readily available, conventional and advanced treatment processes that can be used to treat contaminated waste water containing high levels of nitrogen contaminants for subsequent discharge. Most of these treatments processes are of three basic types: agricultural reuse (trucking water), deep well injection, and treatment. The agricultural reuse and deep well injection processes are generally considered short term options, because there is an uncertainty of the long term agricultural needs for the high nitrogen contaminated waste water and deep well injection is dependent on the availability of injection wells.

There are treatment processes, which appear to be long term solutions. These treatment processes can be organized into three categories: reverse osmosis treatments, ion exchange treatments, and biological treatments. Commercial biological ammonia removal systems cannot directly process urea and commercial biological nitrate removal systems are currently limited to 100 mg/L due to nitrate inhibition (toxicity). Physical processes do not reduce the waste, they either concentrate it exchange it for a different chemical waste. Ion exchange produces a chemical waste and reverse osmosis simply concentrates the waste producing large volumes of hazardous waste.

Although numerous treatment options exist, there is a need in the art for a system that will treat high nitrogen-content waste water in an efficient and controlled manner, especially in a manner that is quickly adjustable with respect to the volume or amount of waste water required to be treated such as waste water created during rain falling on a site having a source of nitrogen containing compounds.

SUMMARY OF THE INVENTION

Embodiments of the present invention provide systems of treating waste waters having a high nitrogen content, where the system includes three subsystem or major components arranged in a series configuration: 1) a precipitation and conditioning subsystem, 2) an ammonia stripper and neutralization subsystem and 3) a denitrification subsystem. The system is capable of reducing a nitrogen level of a waste water from hundreds of parts per million (ppm) to levels below 10 ppm or to nitrogen levels below applicable discharge requirements established by federal, state or local governmental entities. The system is also adapted to reduce other contaminations by means of precipitation using caustic and ammonia removal through the formation of an ammonium salt.

Embodiments of the present invention provide apparatuses for treating high nitrogen content waste waters including a precipitation and conditioning unit, an ammonia stripper and neutralization unit, and a denitrification unit. The precipitation and conditioning unit includes an optional water aeration apparatus and one or a plurality of precipitation and conditioning stages. The ammonia stripper and absorber or neutralization unit include a plurality of ammonia air stripper assemblies and absorber assemblies. The stripper assemblies strip ammonia from the water, while the absorber assemblies convert the absorbed ammonia gas to an ammonium salts by reaction with a mineral acid such as sulfuric acid. The ammonium salt is accumulated and stored as an ammonium salt liquor such as an ammonium sulfate liquor. The denitrification unit includes a plurality of absorber columns, where the absorbent is circulated in a bacteria supporting medium. The absorbent is adapted to absorb all or substantially all nitrogen-containing compounds remaining in the water from the ammonia stripper and neutralization unit, while the bacteria convert the absorbed nitrogen-containing compounds into nitrogen gas or into amino acids used by the bacteria to make proteins. The apparatuses can also include a polishing unit. The apparatuses are adapted to convert waste water having a high nitrogen content and other unacceptable contaminants into an effluent water that meets or surpasses all applicable regulations concerning contaminants in water to be discharged into the environment from retention ponds or other sources of waste water.

Embodiments of the present invention provide methods for treating waste water including a high level of nitrogen contaminants, where the method includes supplying a waste water stream to an apparatus of this invention. The method may optionally include the step of aerating the waste water prior to it being pumped into a precipitation and conditioning unit of the apparatus of this invention. The method also includes the step of adding a sufficient amount of caustic from a caustic source to raise a pH of the waste water (aerated or not aerated) to a pH of at least 8. The method includes the step of removing precipitate from the resulting pH-adjusted waste water. The method includes the step of adding sufficient caustic from the caustic source to increase the pH to at least 10. The method includes the step of removing precipitate. In certain embodiments, the caustic can be added in a single addition to raise the pH to at least pH 10. In other embodiments, the caustic can be added in two or more stages to effect selective precipitation of various precipitatable contaminants. The method includes the step of heating the resulting water to a temperature of about 70° C. However, the system can operate between about 40° C. and 70° C. The temperature adjusted waste water is then passed through a plurality of ammonia strippers to remove ammonia from the water. The method also includes the step of adding sufficient sulfuric acid to stripped and absorbed ammonia to form an ammonium salt liquor such as an ammonium sulfate liquor. The method also includes passing a portion of the resulting waste water into a plurality biological denitrification units. The method also includes adding active denitrifying microorganisms and a microbial nutrient formulation to the waste water. The denitrification units include an absorbent and a bacterial population sufficient to consume residual ammonia and other nitrogen-containing compounds and to convert nitrates and nitrites into nitrogen gas to produce a water effluent having a nitrogen content of no more than 10 ppm. In certain embodiments, the water effluent has a nitrogen content of no more than 5 ppm. In certain embodiments, the water effluent has a nitrogen content of no more than 3 ppm. In certain embodiments, the water effluent has a nitrogen content of no more than 1 ppm. In certain embodiments, the water effluent has a nitrogen content of no more than 0.5 ppm. In certain embodiments, the water effluent has a nitrogen content of no more than 0.4 ppm. In certain embodiments, the water effluent has a nitrogen content of no more than 0.1 ppm.

BRIEF DESCRIPTION OF THE DRAWINGS

The invention can be better understood with reference to the following detailed description together with the appended illustrative drawings in which like elements are numbered the same:

FIGS. 5A-E depict an embodiment of an AR subsystem of this invention.

FIG. 5F depict another embodiment of an AR subsystem of this invention.

FIG. 6A-C depict an embodiment of a denitrification subsystem of this invention.

FIG. 9A-C depicts 3D renderings of the system of FIG. 3A illustrating the safe path feature of the invention.

FIGS. 9D-G depict 3D renderings of a safe path section featuring a momentum block and pump configuration for feeding the denitrification units.

DETAILED DESCRIPTION OF THE INVENTION

Figure 1:
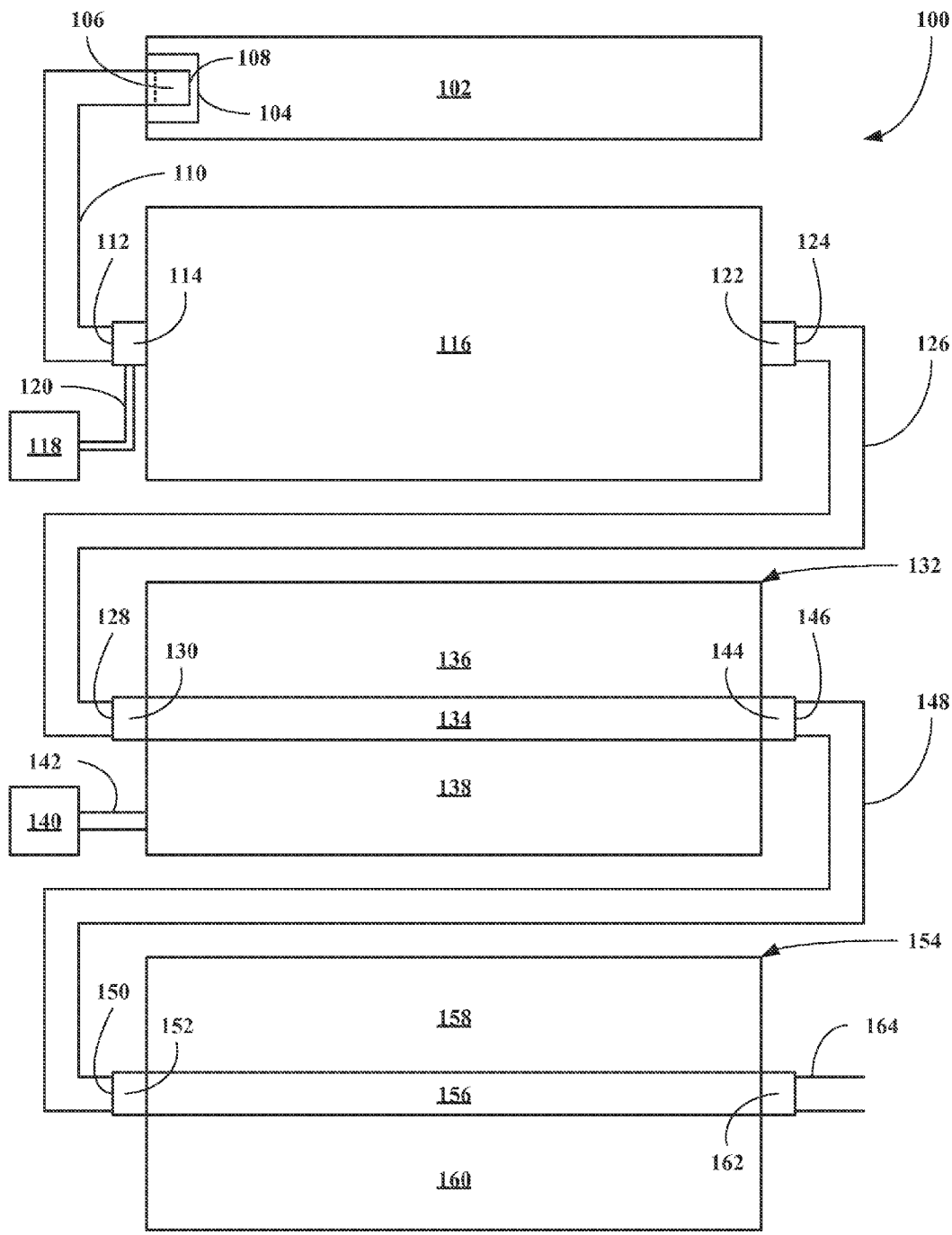
FIG. 1 depicts a block diagram of an embodiment of a waste water treating apparatus or facility of this invention including a waste water source, a precipitation and conditioning unit, an ammonia stripping and neutralization unit, and a denitrification unit.

The inventors have found that a system, an apparatus, and a method can be constructed and implemented for reducing nitrogen contaminants in waste water to levels below Federal, State and/or Local regulatory requirements. The system and apparatus includes at least three components: 1) a precipitation subsystem, 2) an ammonia stripping subsystem, and 3) a denitrification subsystem. The system can also include a polishing subsystem. The inventors have found that by using these three subsystems in series, waste water having a nitrogen level in the hundreds to thousands of parts per million can be reduced to a water effluent having a nitrogen level below about 10 ppm. In certain embodiments, the nitrogen level can be reduced below about 7.5 ppm. In other embodiments, the nitrogen level can be reduced below about 5 ppm. In other embodiments, the nitrogen level can be reduced below about 4 ppm. In other embodiments, the nitrogen level can be reduced below about 3 ppm. In other embodiments, the nitrogen level can be reduced below about 2 ppm. In other embodiments, the nitrogen level can be reduced below about 1 ppm.

The inventors designed the present systems and apparatuses to handle waste water such as storm water runoff associated with various rain events, which results in a potentially large range of hydraulic loading conditions that would prevail during and after various storm events (ranging from a light sprinkle to a continuous heavy driving rain). The systems and apparatuses were engineered to (a) treat contaminated waste water such as storm water runoff in consistent manner, as needed to prevent uncontrolled overflows at retention ponds, while (b) ensuring compliance with the federal, state and/or local rules and regulations pertaining to a discharge of contaminated water and to a quality of water releasable into a given environment.

The systems and apparatuses of this invention were designed to achieve the following characteristics:

First, the systems and apparatuses of this invention will be capable of reducing trace metal concentrations that may be present in the waste water at a concentration level exceeding applicable surface water quality standards imposed by law and/or pose potential toxicity issues to the aquatic life in the desired discharge area such as a river, bay, or the like. The trace metals include, without limitation, copper and/or zinc. Embodiments of the systems and apparatuses will reduce the concentrations of these trace metals to acceptable or desired low concentrations. In certain embodiments, the low concentrations will be in the parts per million range and in other embodiments the low concentration will be in the parts per billion range.

Second, the systems and apparatuses of this invention will be capable of reducing relatively large nitrogen concentrations on the order of 400 to 4,000 milligrams per Liter (mg/L), which are present in various forms including ammonia, nitrate, nitrite, and urea.

Third, the systems and apparatuses of this invention are capable of achieving levels of treatment necessary to remove sufficient contaminant mass at all times under all conditions. The systems are designed to be able to operate even at near saturated conditions of various ionic species such as sulfate, silica, calcium, and other contaminants.

Fourth, the systems and apparatuses of this invention are capable of reducing contaminants from potentially large volumes of waste water generated by sudden rainfall events, especially, in situations, where the facility undergoing the runoff has limited storage volume. The treatment system are designed to be capable of being quickly activated and to quickly achieve a desired level of treatment within hours or days so that an overflow condition of the retention ponds or other temporary storage vessels does not occur.

Fifth, the systems and apparatuses of this invention will be capable of reducing to adjust the hydraulic flow-through capacity of the system downward in order to optimize and operate the system through the rainy season of the year while avoiding multiple start-ups and shut-downs of the system;

Sixth, the systems and apparatuses of this invention are capable of properly treating storm water runoff in contact with a high strength nitrogen source such as a fertilizer material as runoff amounts and concentrations of dissolved nitrogen compounds vary with time due to rainfall intensity. The systems are capable of consistently producing an effluent meeting the requisite water quality criteria as well as passing toxicity testing requirements associated with a given facility.

Seventh, the systems and apparatuses of this invention are capable of properly addressing potential emissions of ammonia into the atmosphere by means of selecting suitable control strategies and technologies.

Eighth, the systems and apparatuses of this invention are capable of minimizing the overall complexity of the system so that it can be operated by a typical waste water operator, who will be capable of controlling the treatment process, absent of extreme conditions, thus, reducing the annual cost to operate and maintain the system.

Ninth, the systems and apparatuses of this invention will be capable of configuring and situating the system in such a manner so that the overall footprint of the system minimizes impact on use and configuration of the existing site, even though there may be limited open area surrounding a given facility.

Suitable Reagents and Components

Suitable mineral acids for use in the present invention include, without limitation, nitric acid, phosphoric acid, sulfuric acid, hydrochloric acid, acetic acid, or mixture or combinations thereof. In certain embodiments, the mineral acid comprises nitric acid or sulfuric acid.

Suitable bases for uses in the present invention include, without limitation, alkali metal hydroxides, alkaline metal hydroxides, alkaline metal oxides, certain transition metal hydroxides, and mixture or combinations thereof. In certain embodiments, the base comprises sodium hydroxide, potassium hydroxide, calcium oxide, calcium hydroxide, cesium hydroxide, barium hydroxide, and mixtures or combinations thereof.

Suitable microorganisms for use in the present invention include, without limitation, any denitrifying bacteria or other microbes or mixtures or combinations thereof. Exemplary examples include, without limitation, heterotrophic bacteria (such as *paracoccus denitrificans* and various *pseudomonads*), although autotrophic denitrifiers have also been identified (e.g., *thiobacillus denitrificans Micrococcus denitrificans/Paraoccus denitrificans, Pseudomonas*, etc.). Denitrifiers are represented in all main phylogenetic groups. Generally several species of bacteria are involved in the complete reduction of nitrate to molecular nitrogen, and more than one enzymatic pathway have been identified in the reduction process. Any suitable bacteria may be used in the denitrification cells or units of this invention, such as bacteria of the genera *Aeromonas, Psuedomonas, Bacillis*, or mixtures or combinations thereof. In certain embodiments, the culture used in the bio-denitrification units include about 5% aerobic microorganisms, which are used to control the dissolved oxygen (DO) level in the units. However, the exact ratio of anoxic microbes to aerobic microbes may be varied based on the waste water contaminant composition. Measurements of the DO level in two zones of the units are in a cascade control loop to control food and micro-nutrients to the column to support robust microbial growth. The terms microorganism and microbes are used interchangeably throughout the specification. In certain embodiments, the microbes are mesophilic microbes, while in other embodiments, the microbes are heterotropes, while in other embodiments, the microbes are thermophilics microbes, while in yet other embodiments, the microbes are mixture of two or more of these classes of microbes.

Suitable absorbent media for use in the present invention include, without limitation, natural zeolitic materials, surfactant modified zeolitic materials, synthetic zeolitic materials, surface modified synthetic zeolitic materials, clays, activated carbon and other adsorbing and or absorbing granular materials. Exemplary examples of suitable zeolitic materials include, without limitation, naturally occurring zeolitic materials and synthetic zeolite materials. Zeolites are minerals that have a micro-porous structure. They are basically hydrated alumino-silicate minerals with an "open" structure that can accommodate a wide variety of cations, such as $Na^+$, $K^+$, $Ca^{2+}$, $Mg^{2+}$ and others. Natural zeolites form where volcanic rocks and ash layers react with alkaline groundwater. Zeolites are the aluminosilicate members of the family of microporous solids known as "molecular sieves". The term molecular sieve refers to a particular property of these materials, the ability to selectively sort molecules based primarily on a size exclusion process. This is due to a very regular pore structure of molecular dimensions. The maximum size of the molecular or ionic species that can enter the pores of a zeolite is controlled by the diameters of the tunnels. These are conventionally defined by the ring size of the aperture, where, for example, the term "8 ring" refers to a closed loop that is built from 8 tetrahedrally coordinated silicon (or aluminum) atoms and 8 oxygen atoms. These rings are not always perfectly flat and symmetrical due to a variety of effects, including strain induced by the bonding between units that are needed to produce the overall structure, or coordination of some of the oxygen atoms of the rings to cations within the structure. Therefore, the pore openings for all rings of one size are not identical. The adsorption properties applicable to the present application are primarily electrostatic in nature and are primarily surface charges. The crystal structure is of interest only in the context of the structures ability to trap micelles or micellular structure in such a way as to make nearly permanent the surfactant such as a hexadecyltrimethylammonium (HDTMA) surfactant in surfactant modified zeolitic material, where the surfactant flips the surface charge to a specific charge density per unit area producing nitrate selective binding sites.

Suitable microorganism nutrient mixtures for use in the present invention include, without limitation, methanol, ethanol, or any other carbon source for use with the above listed microorganisms or any other microorganisms that degrade nitrates and/or nitrites and/or other nitrogen containing compound amendable to biodegradation;

System and Apparatus Configurations

The system and apparatus configurations are divided into three primary physical/chemical operations: trace contaminant precipitation and solids handling, ammonia removal and recovery, and nitrate/nitrite removal.

Trace Contaminant Precipitation and Solids Handling (TCP) System

In certain embodiments, the TCP subsystem includes a two stage precipitation process, TCP1 and TPC2, intended to reduce trace metals, phosphates, scale-producing compounds and/or other components that can be precipitated by caustic concentrations in waste water or other suitable reagent or combinations of suitable reagents or combination of other suitable reagents and caustic. Waste solids from all process subsystems are also returned to the TCP subsystem for removal and primary dewatering. The conditioning and precipitation process can include four unit operations. First, the raw waste water is degassed/oxidized using a static venturi aerator to equilibrate the raw waste water to atmospheric conditions prior to introducing the waste water into the first stage TCP1. In certain embodiment, the raw waste water is heated either before or after degassing to a temperature of about 72° C. or 160° F. Second, caustic or another equivalent base is added to TCP1 to convert trace metals and scale-producing compounds into insoluble hydroxides or oxide to facilitate removal of these components from the waste water via precipitation. Caustic or another equivalent base is added to TCP2 to further raise the pH to further raise the pH for ammonium recovery. Third, precipitation/desaturation is mechanically enhanced in each stage, TCP1 and TCP2, by flow control. A type of upflow fluidized bed is created to desaturate the pH adjusted or neutralized stream. Fourth, primary dewatering via a contact clarification process removes the bulk of the solids precipitated as well as those returned from other processes. pH adjustment, precipitation/desaturation and primary dewatering unit operations are accomplished in two steps to prevent metals such as zinc precipitated in TCP1 from re-dissolving at higher pH needed in TCP2.

In TCP1 sufficient caustic or other equivalent base is added to adjust the pH of the waster water to about pH 8.0, in a first step neutralization. Raising the pH to about pH 8 causes trace metals, limestone and silica to precipitate. In TCP2, sufficient caustic or other equivalent base is added to further increases a pH of the waste water to about pH 10. Raising the pH to about pH 10 causes phosphates, magnesium hydroxide, limestone and the remaining silica to precipitate and causes ammonium to be converted to gaseous ammonia for stripping. Accumulated solids are stored within the TCP basins for seasonal removal and disposal. Each stage is of a length sufficient to permit time for precipitate to sink into a precipitate reservoir formed in the TCP between its inlet and its exit. Clean water is allowed to flow out of the exit, which is above the precipitate height. In certain embodiment, especially, when treating waste waters including urea as one of the nitrogen-containing contaminants, the raw water is pre-heating to a temperature of at least 50° C. and providing additional water hold up time until the urea thermally hydrolyzes to ammonia and carbon dioxide. In other embodiments, the temperature is at least 60° C. In other embodiments, the temperature is at least 70° C. In other embodiments, the temperature is at least 80° C. At the completion of the urea hydrolysis the nitrogen-containing water with or without concurrent metal precipitation is processed through the ammonia stripping (AS) system. In other embodiments of this invention, hydrolyzing water containing urea by pre-heating the water to a temperature of at least 50° C. and thermally hydrolyzing the urea to ammonia and carbon dioxide, with or without concurrent metal precipitation, and processing the hydrolyzed water through the ammonia stripping (AS) system. In other embodiments, the temperature is at least 60° C. In other embodiments, the temperature is at least 70° C. In other embodiments, the temperature is at least 80° C.

Ammonia Removal and Recovery

Overall nitrogen removal from waste water streams including relatively high nitrogen contents is accomplished in this application through the combination of mechanical stripping and absorbing of ammonia. Mechanical driven processes such as ammonia stripping and absorption are relatively insensitive to ammonia concentration so the processes work as a first pass system to remove ammonia freed during the final raising of the pH of the water to a pH of about 10.

The ammonia stripping (AR) subsystem comprises a closed loop ammonia recovery process including five unit operations designed to recover ammonia, control ammonia emission, and control heat recovery and conservation. The first unit operation comprises a heat transfer component to heat the effluent from the TCP to a temperature optimal for economical and efficient stripping of ammonia. In certain embodiments, the temperature is about 70° C. Recouperative and booster exchangers are used in a heat exchanger subsystem. The second unit operation comprises neutralization to liberate gaseous ammonia, which occurs in the TCP just prior to entry into the ammonia recovery subsystem. The third unit operation comprises stripping employing mass transfer to move ammonia to the gas phase. The fourth unit operation comprises chemical absorption or reaction of the ammonia rich gas from the stripping operation to form an ammonium rich liquid product. In certain embodiments, the ammonium rich liquid product can be a liquid ammonium sulfate product or ammonium nitrate product depending on whether sulfuric acid or nitric acid is used to absorb the gaseous ammonia. The fifth unit operation comprises post neutralization and is employed to return the pH of the ammonia stripped water to a value suitable for the denitrification subsystem. The ammonia recovery (AR) subsystem includes a plurality of coupled stripper and absorber units. The stripper units remove ammonia gas to form a gas streams including the stripped ammonia gas. The stripped ammonia rich gas streams are transferred to the coupled absorber units, which absorb the ammonia in an acid solution to form an ammonium salt solution. The acid can be any mineral acid. In certain embodiments, the mineral acid is either sulfuric acid and/or nitric acid. In the AR subsystem, the stripper units are disposed on one side of the subsystem and their associated absorber units are disposed on the other side. The stripper units feed the absorber units and each stripper absorber pair form an essentially closed loop gas processing assembly. The AR subsystem also includes a safe path through which water is extracted for ammonia stripping and into which ammonia stripped water is returned. The AR subsystem also includes an integrated series ammonia stripping/scrubbing or absorbing stages and an ammonium sulfate product control process using a specific recirculation scheme. In certain embodiments, the absorber units are interconnected so that ammonium salt liquor flows forward from the last absorber to the first absorber, which includes a weir connected to the ammonium salt reservoirs. The embodiments also include a single point acid introduction at a vortex mixer of the second absorber. The embodiments also include an uncontrolled liquid conduit connecting the second absorber to the last absorber and a controlled liquid conduit from the first absorber to the last absorber. The embodiments also include a clean water introduction conduit connecting a clean water source of the first absorber. The single point acid introduction, the uncontrolled interconnecting conduits and the pH monitoring are used to control the efficiency of the AR subsystem with minimal control devices. The absorber 1 clean water introduction, the controlled interconnecting conduits and pH monitoring are used to produce a commercial byproduct ammonium salt. The AR subsystem, therefore, requires only monitoring of a pH in the second absorber which is adjusted to a pH of about 2, a pH of the first absorber to a pH of the ammonium salt liquor, such as pH of about 5.5 for ammonium sulfate and a density of the liquor so that the liquor does not get to concentrated.

Denitrification Subsystem

The denitrification subsystem for nitrate/nitrite removal and ammonia polishing comprises as plurality of series configured biological regenerated adsorptive cells. The cells use two different treatment techniques. Initially, the cells employ a single unit operation, physical absorption of nitrogen-containing compounds. The second operation employs a biological denitrification process that requires a period of time to reach steady state. The denitrification subsystem also includes a safe path from which untreated water is removed and treated water is returned.

The physical adsorption process is used to absorb nitrogen contaminants for subsequent biological denitrification. The absorbent is especially useful during start up, nitrogen surges, or other disruptions. For example, when the system is initially activated, the nitrogen mass of a waste water or the remaining nitrogen mass in the partially treated waste water is absorbed to permit the biological denitrification process to start and achieve steady state. The volume of media needed until the biological denitrification process takes over, is determined by time, hydraulic capacity of the system and the average nitrate/nitrite and other nitrogen contaminant concentrations. Subsequently, once a satisfactory biomass is established, the denitrification process removes nitrogen-containing compounds present in the water as well as nitrogen-containing compounds absorbed on or in the media. Nitrates/nitrites and nitrogen-containing compounds are converted into nitrogen gas which is removed from the system as an inert gas.

The cells are arranged in a series configuration to achieve the nitrogen treatment goals. Each cell is essentially an upflow absorber for nitrates, nitrites, ammonia and some additional anions.

The cell media are regenerated by the bacteria in the cells. Bio-regeneration produces a symbiotic effect. The biological activity reduces the waste produced by regeneration of the media and the media reduces the toxic effects of the contaminants on the bacteria, while acting as a surge device to permit treatment during startup and smooth out rapid changes in nitrogen contaminant concentrations in the waste water caused by accidental spills or other accidental contaminations.

Bench and full scale testing of the cells was used to verify that bio-regeneration cells were cost effective for the specific type of water that would be treated and to evaluate the efficiency of media regeneration. Testing was also performed to determine the effects of the super-salinity on the media and to determine some estimate of the attrition rate of the media.

Embodiments of the BioRA apparatuses, methods and enabling technologies of this invention comprises adsorption/desorption, continuous plug flow device and method for denitrification of high nitrogen content waste waters. Each BioRA cell supports a dual isolated recirculation loop system comprising a media recirculated loop and a water treatment loop providing for be expansion. The media loop provides sufficient particle shearing to dislodge dead or weakly bond microorganism films growing on the exterior surface of the media, but insufficient to cause degradation of the friable media that is the shear causes only minimal degradation (reduction of particle size) of the media. The term minimal in this context means less than about 1 wt. % of the media undergoes a size reduction per day (24 hours) or less than about 0.1 wt. % per cycle. In other embodiments, the term minimal in this context means less than about 0.5 wt. % of the media undergoes a size reduction per day or less than about 0.05 wt. % per cycle. In other embodiments, the term minimal in this context means less than about 0.1 wt. % of the media undergoes a size reduction per day or less than about 0.25 wt % per cycle. In other embodiments, the term minimal in this context means less than about 0.09 wt. % of the media undergoes a size reduction per day or less than about 0.015 wt % per cycle. Thus, the loops achieve media washing, while causing minimal particle size reduction. The media recycle loop comprises inducers where downward flowing media enters one of a plurality of inducers which is swept along the inducers by the recirculating backwash. The flow the recirculating backwash is sufficient to shear the media dislodging dead or weakly bond biofilm from the media and lifts the media to the ultra low pressure drop hydrocyclone.

Raw water is introduced into the cells via a distributing header that produces a substantially even or even distribution (i.e., a uniform or substantially uniform distribution) of incoming water that carries microorganisms, microorganism nutrients and other materials to achieve a desired environmental profile throughout the cell. The term substantially here means that the profile of incoming nutrient rich water is even or uniform across the cells cross-section at the header, with no more the a 10% different in nutrient concentration across the cross-section at the header. In certain embodiments, the nutrient concentration difference by no more than 5%. In other embodiments, the nutrient concentration difference by no more than 1%. Such even or uniform distribution improves microorganism utilization and reduces hot spots and channeling. The even or uniform distribution is achieved through a designed pattern of holes in the header so that each hole attains a near equal flow of nutrient rich incoming water. The even or uniform distribution cause the zone above the header to operate in an expanded bed mode, where particles are separated, but do not move independently. Thus, the cells becomes a plug flow reactor with improved microbe activity throughout the zone above the header.

A portion of the recirculating water used in the inducers is feed into the raw water before it enters the distributing header to complete the backwash recirculation loop. By controlling the microorganism composition and the nutrient balance in the cells, the cells achieve an integrated production of anoxic conditions above the distributing header and a respiratory inhibited zone below the distributing header. The respiratory inhibited zone is the zone where electron donors, carbon and or other inhibiting nutrients are supplied to the biomass by desorption and endogenous decay. The zone becomes suboxic just prior to the slurry entering the collection and up lift assembly.

Each cell will generally include three zone: an aerobic zone, an anoxic zone and a respiratory inhibited zone. However, in certain cells, the aerobic zone may be minimal or absence depending on the initial conditions of the incoming water. The microorganisms that degrade nitrate and nitrite are relatively sensitive to dissolved oxygen (DO). At DO values above about 0.8 mg/L, these microorganism use molecular oxygen as the electron acceptor instead of oxides of nitrogen until the DO value falls below about 0.4 mg/L. Such an aerobic zone will exist whenever the DO value is high enough to inhibit the nitrate/nitrite destroying microorganisms proliferation and aerobic microorganism are added to the water to reduce the DO value so that an active anoxic zone can be established in the cells. Thus, the aerobic zone can range between about 0% of the height of the cell to about 30% of the height of the cells. The respiratory inhibited zone can range from about 7% to about 30% of the height to the cell. The remainder of the cells will be the anoxic zone. The height is measured from the exit of the ultra low pressure drop three phase separating hydro cyclone. The cell condition are thus adjusted so that a desired ratio is produced between the three zones: the aerobic zone, the anoxic zone and respiratory inhibited zone. The ratio can be about 30:40:30 to about 0:70:30 to about 0:93:7 to about 30:63:7 or any other value depending on the waste water to be treated and on the desired outcome.

The cells operate on an indirect biological desorption process. The media is primarily responsible for fast absorption or adsorption of the nitrates/nitrites in the waste water and to support the formation of microbial film on the surfaces thereof. The microorganisms degrade the nitrate/nitrite in the water. As the water levels of the nitrate/nitrite are reduced, absorbed or adsorbed nitrate/nitrite in or on the media desorb into the water so that the bulk of the nitrate/nitrite degradation occurs at the film-water interface.

The distributing header is designed to achieve bulk flow distribution control so that nutrients and nitrate/nitrite rich water is evenly or uniformly distributed across a cross-section of the cells as described above.

The cells also include a gas back pressure control utilizing the media recirculation loop. As nitrogen gas and carbon dioxide gas are produced due to microbial degradation of nitrates/nitrites in the water, a substantial amount of the gas collects as bubbles on the media, which is flowing down through the cells to be collected and recirculated through the inducers in the respiratory inhibited zone of the cells. Thus, the gas pressures in the BioRA cells can be effectively controlled by the speed of the recirculating media upon which a substantial fraction of the produced nitrogen and carbon dioxide gas accumulate as bubbles. Oxygen gas content can optionally be controlled by an aerator connected to the media recirculation loop. Thus, each BioRA cell can be operated with different gas back pressure control using microbial produced nitrogen and carbon dioxide in the absence or presence of added oxygen gas in the form of pure oxygen, air or any other oxygen containing gas.

The media recirculation system is not only used to recirculate the media, the recirculation also server as a selective biomass reject and media cleaning system. As stated above, the media is collected into a plurality of inducers, where a recirculating backwash water flow subjects the media particles to shear sufficient to dislodge dead microorganisms and/or weakly bound microbial films as the media is being recirculated. Thus as the recirculating media stream enters the ultra low pressure drop hydrocyclone, the media is cleaned from shearing and clean water entering the exit of the hydrocyclone acts to achieve a separation between the cleaned media and the dislodged dead microbes and weakly bound microbial films. The recirculation loops also act as a biomass growth limitation process, where biomass growth can be regulated to reduce biomass plugging and other adverse tendencies of bio-remediation processes. The loops and removal systems also permit continuous decay and respiration product removal from the biomass.

As stated above, the ultra low pressure drop three phase separating hydrocyclone provides upper flow of cleaned water to wash the sheared media as the sheared media particle flow downward through and out of the hydrocyclone. The inducer system of media pickup and recirculation is specifically designed to control shear (energy) for handling friable solids so that dead and weakly bound microbial films can be removed from the media with minimal particle size reduction of the friable solid particulate media.

The denitrification system includes a safe path as described below as a dilution control system. Each BioRA cell pulls water from the safe path and discharges clean water to the safe path. Thus, for series arranged BioRA cells, the first cell draws water from the safe path that is a mixture of all the untreated water entering the safe path and a portion of the treated water from the first cell, while the second BioRA cell draw water from the safe path that is a mixture of all the treated water from the first cell not mixed in its feed and a portion of the discharge of the second cell and subsequent cells operate in the same method. As a result, the safe path water has a continuously decreasing nitrogen content as the water flow downstream through the denitrification system. While many of the embodiments of this invention utilize series configured BioRA cells, the denitrification system can use parallel BioRA cells or a combination of series and parallel BioRA cells depending on outcome and design requirements.

In series operations, a denitrification system of BioRA cells configured in series can be operated so that water passes downstream and rejected water can be passed upstream or downstream. Moreover, the cells or units can be configured in a manner to take advantage of endogenous decay, thereby reducing the methanol consumption as well as the amount and characteristic of the waste production.

In series operations, the denitrification system includes a two stage methanol control. Intentional methanol slip with DO measurement of aerobic zone is used for automatic feedback control of methanol introduction, while methanol control trim using DO measurement of enzymatic nitrite reduction is used as cascaded trim of automatic feedback control of methanol introduction. While methanol is used as the carbon nutrient source, any other nutrient source can be used depending on the microorganisms being used and the environment to be achieved, e.g., the ratio of aerobic, anoxic and respiratory inhibited zones.

Because the biomass synthesis or proliferation consumes ammonia, ammonia reduction in the denitrification system is reduced by biomass reject and a caustic lysing scheme. For system where the denitrification system is part of a treatment system that include a precipitation system and an ammonia stripping/absorbing system, this rejection and lysing is achieved in the precipitation system where caustic is used to precipitate certain minerals in the water prior to subsequent process.

There are two distinctly different BioRA cell apparatus designs, possibly three that can produce a desired BioRA effect. A number of different media are envisioned for handled other constituents. The present design can be use with only minor variations to remove sulfates and there are several versions for BTEX biomass.

New Embodiment—Multipoint Pickup with Inducers

Another embodiment the present invention provides a denitrification system including at least one denitrification column, where the column or unit includes an inlet, an outlet, an optional aerobic zone, an anoxic zone, a clean water zone, a respiratory inhibition or inhibited zone, and a gas overhead zone. The unit also includes an ultra low pressure drop hydro cyclone, a water recirculation and media recirculation subsystem. The unit also includes a nitrogen-rich, nutrient rich, and microbial rich raw water supply distributor adapted to produce an even or substantially even distribution (i.e., a uniform or substantially uniform distribution) of nitrogen-rich, nutrient rich, and microbial rich raw water across a cross-section of the column to improve nutrient utilization and reduce hot spots and channeling. The column is a counterflow column with water flowing up as it is being denitrified and absorptive media flowing down. The absorptive media is collected in the water recirculation and media recirculation subsystem, where collected media is mixed with recirculating water and lifted into the hydrocyclone. The water entering the water recirculation and media recirculation subsystem is sufficient to dislodge dead microbes and weakly bound microbial films from the media, but insufficient to reduce media particles size. Thus, the shear is carefully controlled to achieve media cleaning, while minimizing particle size reduction of the media. The inlet is adapted to receive an aqueous stream to be treated containing an unacceptable concentration of total nitrogen. The water and media recirculation subsystem includes a solid nitrogen absorbent and a bioactive slurry, where the assembly is adapted to circulate the slurry from a bottom of the respiratory inhibited zone to a top of the anoxic zone. The absorbent absorbs the nitrates and nitrites in the aqueous upflowing stream, while microorganisms in the bioactive solution convert the nitrates and/or nitrites into nitrogen gas in all of the zones of the column, except of gas overhead zone, while ammonia and other nitrogen-containing compounds are consumed by the microbes. The water in the slurry as it is being treated progresses from the stream inlet to the stream outlet.

Another embodiment of the water and media recirculation subsystem of this invention includes a plurality of media lift headers and at least one inducer feed header. Each media lift header includes a straight stem having a plurality of branches and an output manifold. The media lift headers also include a flush line having an input manifold. Each flush line includes a first bend and a straight segment, where the first bend positions the straight segment to run above the stem of the media lift header. The flush line includes a second bend, where the flush line enters the stem just upstream of the output manifold. The second bend is a complex bend have an upward segment and a downward segment angled into the stem. The angled segment makes an angle g with the stem of between about 15° to about 45°. In other embodiments, the angle $\gamma$ is between about 20° and 40°. In other embodiments, the angle $\gamma$ is between about 25° and 35°. In other embodiments, the angle $\gamma$ is about 30°.

Each branch includes an inducer and an aperture. The branches make an angle $\delta$ with the stem between about 30° and about 60°. In certain embodiments, the angle $\delta$ is between about 40° and 50°. In other embodiments, the angle $\delta$ is about 45°. The inducer feed header includes a plurality of distribution nozzles.

The subsystem also includes a plurality of conduits connecting the nozzles to the inducers.

As the media rich slurry flows down the column, the media rich slurry is funneled into the apertures in the media lift headers. The number of apertures is designed to be sufficient to provide a more uniform collection of the slurry, while minimizing inhomogeneities in collection of the slurry into the media lift headers. The conduits supply recirculation water to the inducers associated with the apertures at a non-aspirating flow rate. In certain embodiments, the flow rate is the same or substantially the same as a flow rate of the slurry entering the branches of the media lift header through the pickup apertures. The terms substantially the same as used here means that the flow rate of the recirculation water and the flow rate of the slurry into the branches through the apertures is within about 10% of each other. In other embodiments, the flow rates are with about 5% of each other. In other embodiments, the flow rates are with about 2.5% of each other. In other embodiments, the flow rates are with about 1% of each other. The diluted medium slurry then proceeds down the media lift header.

The media lift headers taper down from their output manifolds to their last branches. The tapering is designed to maintain the slurry flow through the header at a rate that reduces media particle size reduction and reduces slurry separation.

The header output manifolds are connected to lift lines situated exterior to the column. The lift lines are combined into a main line prior to the main line entering the column to feed the hydrocyclone. The lift lines and main line are configured in such a way as to reduce or eliminate flow into an unused or plugged lift line as is well known in the art. The lift lines and main line is constructed with branch connections to form a distributed slurry systems.

The input and output manifolds of the lift header and feed headers are all situating so that they all have the same or substantially relative hydraulic loss distribution. The term substantially means that the relative hydraulic loss distribution of the headers are within about 20% of each other. In other embodiments, the relative hydraulic loss distribution of the headers are within about 10% of each other. In other embodiments, the relative hydraulic loss distribution of the headers are within about 5% of each other The recirculation water is supplied by the recirculation water pump assembly to the input manifolds of the feed headers at a rate to maintain a non-aspirating flow into the inducers. The recirculation water pump assembly is also connected to the input manifolds of the flush lines of the media lift header. The flush lines are used to unplug the manifold and lifts lines if they plug. Flushing of the manifold and lift lines may be performed on a regular schedule for maintenance purposes or only when needed.

Aspects of Methods Associated with Operation of the Denitrification System

Embodiments of this invention relate to an adsorption method including supplying a waste water stream having a high level of a contaminant such as oxides of nitrogen to a bio-denitrification column through a distributor. The distributor is located in a lower middle region of the column. The method also includes supplying a medium slurry into an upper middle region of the column through a venturi feed apparatus. The two supplies produce a counter-flow zone in the column, which extends from a position immediately below the distributor to an output of the venturi apparatus. The counter-flow comprises medium flowing down from the venturi feed apparatus and water flowing up from the distributor. The water distributor supplies water distributed across the entire cross-section of the column at a rate that produces an expanded bed under plug flow conditions throughout the column. The expanded bed is defined as an upward liquid flow through medium bed at such a velocity as to cause the individual particles to partially separate, increasing the placed volume of the bed, but not at a velocity to change their relative position to each other. In certain embodiments, the velocity is sufficient to partially separate at least 70% of the particles in the medium. In other embodiments, the velocity is sufficient to partially separate at least 80% of the particles in the medium. In other embodiments, the velocity is sufficient to partially separate at least 90% of the particles in the medium. The expanded bed reduces or eliminates channeled flow in the column. Below the counter-flow zone is a co-flow zone, where the medium and residual water flows into a respiratory inhibited zone (RIZ) and ultimately into a medium slurry collection and uplift subsystem.

Embodiments of this invention relate to an adsorption method including establishing a stationary, mass transfer zone within the counter-flow zone of the column, where the medium is continuously replaced maintaining a static adsorptive capacity in the counter-flow zone of the column. In this zone, active microbial growth is occurring at a rate of at least doubling a microbe population in the counter-flow zone. The stationary zone is limited by x/m ratio at maximum concentration verses breakthrough at minimum x/m. The stationary zone reduces the total volume of medium required to operate the bio-denitrification unit regenerated medium is always being introduced, while fully populated medium is withdrawn and regenerated.

Embodiments of this invention relate to an adsorption method including biologically assisted regenerating the medium, which is an integral feature of the method of this invention as this assisted regeneration is integral to maintaining the stationary, mass transfer zone. The microbes in the medium slurry forms a film on the medium. The medium is an active nitrate/nitrite adsorbent/absorbent. Thus, a portion of the nitrate/nitrites in the waste water is adsorbed and/or absorbed in and on the surface and pores of the medium. The microbes actively convert nitrates/nitrites in water surrounding them, the water between the particles of the medium. This generally causes the microbes near the surface of the medium to be starved of nitrates and/or nitrites. However, because the medium is an active nitrate/nitrite adsorber and/or absorber, as the nitrates and/or nitrites are depleted in the interstitial water, the nitrates and/or nitrites adsorbed and/or absorbed in and on the surface and pores of the medium is desorbed becoming a source of nitrates and/or nitrites for the microbes near the surface and via diffusion for the microbes on the outer part of the film. In this way, the adsorptive/absorptive capacity of the medium is regenerated so that upon collection, uplift and reintroduction through the venturi feed apparatus, the medium is now capable adsorbing/absorbing nitrates and/or nitrites in the upflowing water as the medium proceeds down through the expanded bed portion of the columns.

Embodiments of this invention relate to an adsorption method including continuously cleaning the medium of foreign material in the co-flow zone of the column and the up-lift subsystem of the column. The column is divided by activity into four primary zone. The upper most zone comprises cleaned up-flowing water. The upper middle zone comprises an expanded bed medium zone in which anoxic denitrification occurs. The middle zone is marked by rapid microbial growth at a rate that results in a 1.5 to 5 times growth rate or increases viable or volatile microbes from about 1000 mg/L at the exit of the slurry feed to about 3000 mg/L at the distributor. The next zone is adjacent the water distributor and is an aerobic zone, where aerobic microorganisms reduce the dissolved oxygen (DO) levels to promote anoxic microorganism growth in the anoxic zone of the column. The in-coming waste water has a defined and controllable DO level and the amount of aerobic microorganisms are controlled by the DO level and are sufficient to reduce the DO level into an anoxic DO level. The lower zone is the respiratory inhibited zone (RIZ), where the medium is no longer in an expanded format and microbial growth is inhibited. The zone becomes suboxic just prior to the medium collectors and results in a reduction of a viable or volatile microbial population, which is rapidly re-established as the slurry is up-lifted and reintroduced into the column through the slurry feed unit.

Embodiments of this invention relate to an adsorption method including establishing a safe path to which the bio-denitrification unit acts as an attached reactor in an adsorption scheme. Mathematically, the safe path and the bio-denitrification units may be modeled as a continuous stirred tank reactor (CSTR), where the units or attached reactors are operating under plug flow conditions. Thus, the safe path is a fixed volume path into which a waste water stream is added and a cleaned water stream exits. Along the length of the safe path, waste water in different degrees of cleaning is being continuously withdrawn into the attached reactors and cleaner waste water is being sent back to the safe path, where that water is mixed with the water in the safe path to form the water for the next bio-denitrification unit (which are arranged in series). The water exiting the last bio-denitrification unit has a desired low nitrate/nitrite level and is now safe to be discharged into the environment. In certain embodiments, the water exiting each bio-denitrification unit is aerated as it flows through a spiral configured outlet pipe into a holding area, where the aerated water is allowed to attain a given dissolved oxygen value before it overflows into the safe path for use as a part of the water going into the next bio-denitrification unit or ultimately exits the bio-denitrification system.

Embodiments of this invention relate to a bio-filtration method including establishing a fixed microbial film surrounding the particles of the medium producing a two sided electron acceptor supply—part of the supply from the interstitial water between the particles and part of the supply from the adsorbed and/or absorbed electron acceptors on and/or within the medium, with the fixed or attached side supply maintained for the longest time and is the most consistent throughout the biomass life, when RIZ is considered.

Embodiments of this invention relate to a bio-filtration method including establishing rapid biomass generation due to the expanded bed, which provides underlying continuous logistics, i.e., supply of carbon, electron acceptor, and micronutrients to all of the biomass and removal of products from all of the biomass and due to a fixed film biomass that moves, within column, toward greater levels of carbon and electron acceptors—toward the waste water distributors. In the present configuration, traditional inhibition limiting carbon and/or electron acceptor only takes place as the downwardly flowing medium exits the anoxic zone.

Embodiments of this invention relate to a bio-filtration method including establishing a continuous growth of biomass in the counter-flow, which provides a microbial environment allowing removal of ammonia through bio-synthesis.

Embodiments of this invention relate to a bio-filtration method including sustaining a sufficient amount of aerobic microbes in the microbes culture in the column to control a dissolved oxygen (DO) environment by controlled introduction of a DO level into the safe path connected to the denitrification units and via the counter flow of fixed film biomass and water to be treated from the anoxic zone to the aerobic zone.

Embodiments of this invention relate to a bio-filtration method including establishing of a safe path attached to the reactors (denitrification units) in biological treatment scheme. Mathematically, the reactors may be described as a Continuous Stirred Tank Reactors (CSTRs) operated under plug flow conditions. The safe path coupled with the reactors disposed in a series configuration, produces the mathematically smallest volume of biomass required to remove substrate while allowing unlimited range of flow treatment.

Embodiments of this invention relate to a biologically assisted adsorbent regeneration method including continuous integral regeneration of adsorbent by desorption of adsorbed and/or absorbed nitrates and/or nitrites driven by the bio-cleansing of interstitial water and pore water in the co-current flow zone of the column.

Embodiments of this invention relate to a biologically assisted adsorbent regeneration method including establishing a regeneration area or a respiratory inhibited zone (RIZ), where the medium and interstitial water enters with a largest biomass, a highest concentration of carbon, electron acceptor and nutrients producing the highest specific denitrification rate in column. In certain embodiments of the column, the RIZ may be adjusted to intentionally reduce volatile biomass to support ammonia removal by synthesis.

Embodiments of this invention relate to a biologically assisted adsorbent regeneration method including establishing a suboxic zone in the column to determine nitrate to reductase interaction by DO measurement.

Embodiments of this invention relate to an electron donor and carbon supply control method including measuring dissolved oxygen in the aerobic zone to control substrate addition by feedback control. In other embodiments, the electron donor and carbon supply control method including measuring dissolved oxygen in the suboxic zone of the RIZ to trim the control of substrate addition by cascaded feedback control. In certain embodiments, the carbon supply, generally methanol, but other carbon sources or combinations are equally useable, is controlled to maintain a DO level between about 0.19 and 0.12. If the DO level goes above 0.19, then more carbon source is added. If the DO level drops below about 0.12, less carbon source is added.

In certain embodiments of the methods of this invention, microbe seeding is only performed at startup, planed shut downs or operational disruptions. However, in all cases, microbe seeding may occur during the course of routine operation, if the microbe population drops below a viable or volatile population insufficient to repopulate a sufficient population in the counter-flow and co-flow zone of the denitrification units.

Additional Effluent Polishing & Conditioning

Absolute full scale plant performance and effluent water characteristics through toxicity testing cannot be determined from a bench scale treatability study. An additional post-treatment conditioning step may be required to adjust the chemistry of the treated effluent to achieve desired or required water release specifications. Thus, polishing units are optional to polish and condition the final effluent to meet a given discharge water profile, to meet levels of various contaminants required by applicable regulations.

Ancillary Components

In addition to the primary components that comprise the treatment system of this invention, there are a plurality of ancillary components that may or may not be required depending on operational parameters.

Air Emissions Control

The majority of the entire treatment process will be operated under anoxic to anaerobic conditions and, consequently, various reduced vapor-phase ion species such as hydrogen sulfide can be liberated during treatment. The system will include a return gas scrubber with barometric leg to capture sulfur based emissions from the biological processes. A closed loop scrubber system is utilized to recover ammonia removed from the pond water minimizing the potential for ammonia emission issues.

Solids Production and Disposal

At this time, it is anticipated that the majority of solids (sludge) that will be produced through the treatment process can be properly managed within the tanks where the TCP occurs and as stated above will result in the primary dewatering of solids. If the TCP produces significant quantities of solids, the TCP can include a solids withdrawal system and/or additional conditioning means such as a secondary dewatering step to concentrate the solid for removal.

Chemical Support Systems

A series of chemical systems are needed to support the operation of the treatment system. Caustic such as lime or sodium hydroxide is used to increase a pH of the waste water in the TCP treatment step at the front of the system. A mineral acid such as sulfuric acid is used to absorb ammonia gas converting into to a ammonium salt liquor and to reduce a pH of the ammonia stripped waste water to a pH level optimal for denitrification prior to routing the waste water into and through the BioRA cells or units. A nutrient such as methanol is used as a substrate source as well as nutrients for the biological denitrification process. All chemical supplies will include a dedicated area for proper storage and protection. The chemicals storage tanks or vessels will include secondary containment provisions. The system will also include dilution facilities, metering pumps, piping, valves, and transfer lines.

Instrumentation & Controls

Instrumentation and controls for the treatment system will be integrated and configured to minimize the amount of time that an operator will need to monitor and remain with the system to ensure that it is operating properly.

System Flow, Reliability and Control Discussion

The three subsystems are connected by a gravity flow scheme using as so called and well known safe path format. A safe path format was developed to extend integrity management into process design.

Simply stated, in safe path configured system, process performance and bulk flow through the treatment system are separate independent controls. Material flow is controlled by passive friction devices (e.g., openings in baffles, etc.). Several systems have been produced to-date using concrete basins with factory supplied critical components bolted in. A safe path configured system is usually cheaper to build, simpler to operate and easier to maintain than traditional, tank batteries, piping racks, valves and pumps. In the system of this invention, an intake structure is placed next to a pond side treatment system. Raw water is delivered to the TCP operation through a venturi aerator from a lift pump located in the intake structure in the pond. Simple reagent addition equipment also discharges into the venturi in the first stage TCP. pH is monitored in the reaction sump of the first stage TCP. The partially neutralized water underflows from the reaction sump to a type of upwell fluidized bed called a Floc Tunnel. The reaction chamber and floc tunnel are part of the stage one contact clarifier, separated by concrete baffles. The partially treated water overflows a submerged baffle into the contact clarifier.

TCP1 and TCP2 are separated by a concrete wall. Partially treated water from stage one (TCP1) overflows into a stage two reaction chamber, where the process is repeated. Other than the lift pump and metering equipment, there are no moving parts in the TCP.

Stage two TCP overflows to an empty chamber separated by a baffle into two sump zones. Water can be drawn from the first sump for heat exchange and then returned to the second sump or allowed to pass around the baffle, where the now un-ionized water underflows into the stripping system. Water flows through the multi-stage stripping system by gravity, underflowing from stage to stage in series. The operation of a recirculation pump connected to the stripper venturi determines whether the stage is operating or a spare. Water passes through the system regardless of stage operation. Stripped water overflows from the last stripping stage to the denitrification subsystem. Treated water underflows from the denitrification subsystem to an empty chamber, where it overflows to discharge. For these portions of the operation, there are no active level or flow controls used. All processes are side streams to the central flow of water.

Gas control devices will also use a safe path construction. Each ammonia stripping stage is connected to a complementary absorber via gas ducts. The aspirating characteristic of Maxi-Strip Venturi mixer moves the gas regardless of the operation of the complementary absorber or stripper. The $H_2S$ scrubber has similar characteristics.

DETAILED DESCRIPTION OF THE DRAWINGS

Embodiments of Systems and Apparatuses for Treating High Nitrogen Waste Water

First Embodiment

Referring now to FIG. 1, an embodiment of the system, generally 100, includes a source 102 of waste water such as a retention pond. The source 102 includes a sump pump 104 having an outlet 106 connected to a first end 108 of a source input conduit 110. The conduit 108 is connected at its second end 112 to an inlet 114 of a precipitation and conditioning subsystem 116, sometimes referred to herein as the TCP subsystem. The precipitation and conditioning subsystem 116 includes a source of a base 118, which is connected to the inlet 114 by a base supply conduit 120. The base is used to adjust the pH of the waste water effluent to a pH sufficient to precipitate precipitatable contaminants. In some embodiments, the subsystem 116 is divided into two or more compartments as described more fully below. The subsystem 116 also includes an outlet 122 connected to a first end 124 of a base treated effluent conduit 126. Sufficient base is added to the TCP subsystem 102 in one or more additions so that the final pH of the base treated effluent is at least pH 10.

The conduit 126 is connected at its second end 128 to an inlet 130 of an ammonia recovery subsystem 132, sometimes referred to herein as the AR subsystem. The AR subsystem 132 includes a safe path 134, a stripper section 136 and an absorber section 138. The absorber section 138 includes a mineral acid reservoir 140 and a mineral acid conduit 142 for supplying the mineral acid to the absorber section 138 to convert stripped ammonia gas into an ammonium mineral acid salt liquor for disposal or use as a fertilizer. The AR subsystem 132 includes an outlet 144 connected to a first end 146 of an ammonia stripped effluent conduit 148. Effluent water from the safe path 134 is withdrawn into the stripper section 136, where an ammonia rich gas is extracted and forwarded to the absorber section 138, where it is reacted with mineral acid such as sulfuric acid or nitric acid to form an ammonium mineral acid salt liquor. The details of the stripper section 136 and the absorber section 138 are shown herein.

The conduit 148 is connected at its second end 150 to an inlet 152 of a denitrification subsystem 154, which uses an absorbent and microorganisms to convert nitrates, nitrites, residual ammonia/ammonium, or other nitrogen-containing compound to form nitrogen gas. The denitrification subsystem 154 includes a safe path 156, an absorber/biological denitrification section 158 and a nutrient supply section 160. The denitrification subsystem 154 includes an outlet 162 connected to a finished effluent conduit 164. Effluent water from the safe path 152 is withdrawn into the absorber/biological denitrification section 158, where the nitrogen-containing compounds are absorbed by the absorbent and converted to nitrogen gas. The nutrient supply section 160 supplies nutrients for the microorganisms. The details of the absorber/biological denitrification section 158 are shown herein.

Second Embodiment

Figure 2A:
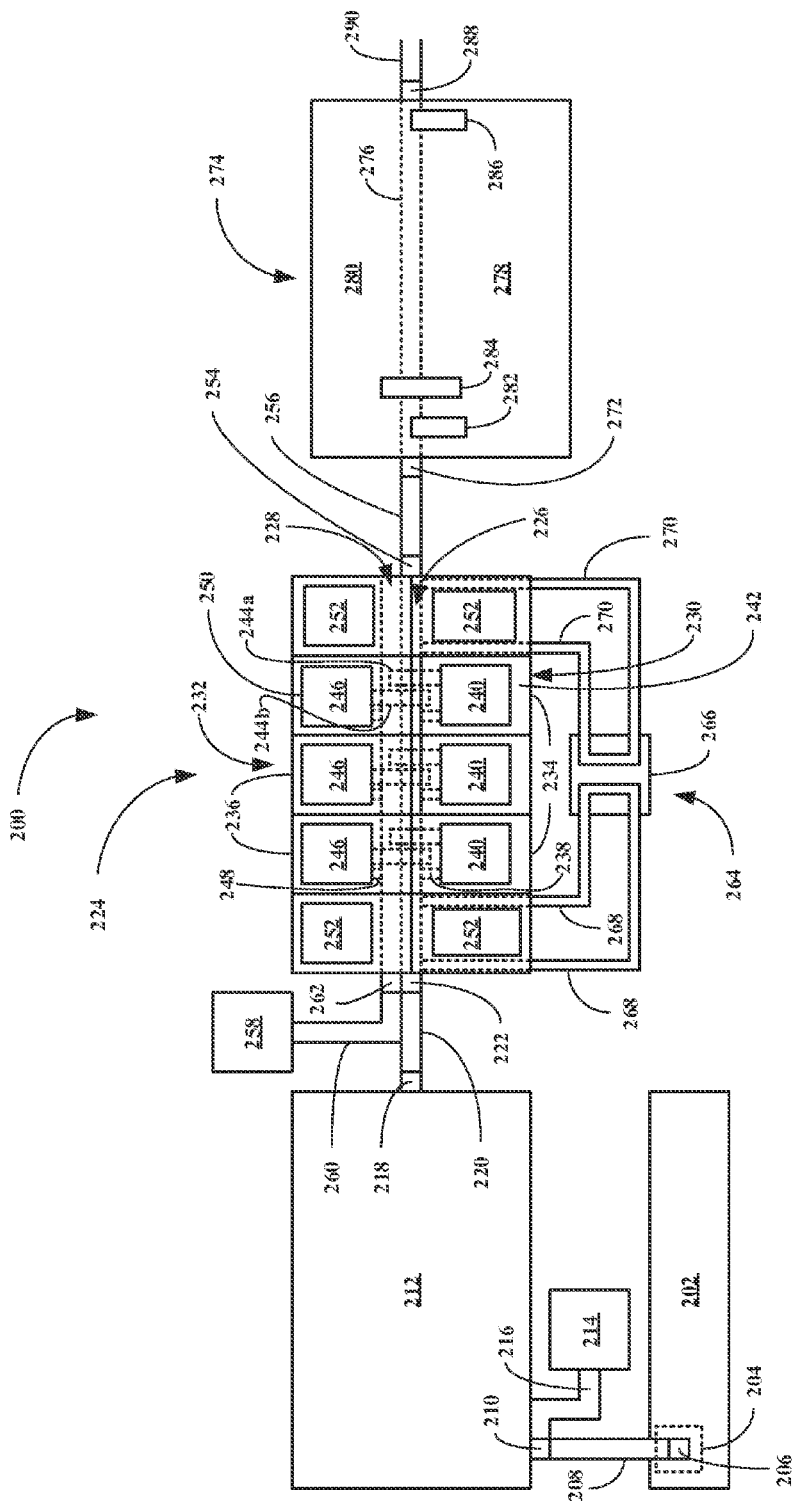
FIG. 2A depicts another embodiment of a water waster treating apparatus or facility of this invention, with a single stage precipitation subsystem.

Referring now to FIG. 2A, an embodiment of the system, generally 200, includes a source 202 of waste water such as a retention pond. The source 202 includes a sump pump 204 having an outlet 206 connected to a source input conduit 208, which in turn is connected to an inlet 210 of a precipitation and conditioning subsystem 212, sometimes referred to herein as the TCP subsystem. The precipitation and conditioning subsystem 212 includes a source of a base 214, which is connected to the inlet 210 by a base supply conduit 216. The base is used to adjust a pH of the waste water effluent to a pH sufficient to precipitate precipitatable contaminants. In some embodiments, the subsystem 212 is divided into two or more compartments as described more fully below. The subsystem 212 also includes an outlet 218 connected to a base treated effluent conduit 220. Sufficient base is added to the TCP subsystem 216 in one or more additions so that a final pH of the base treated effluent is at least pH 10.

The conduit 220 is connected to an inlet 222 of an ammonia recovery subsystem 224, sometimes referred to herein as the AR subsystem. The AR subsystem 224 includes a safe path 226, a mineral acid supply path 228, a stripper section 230 and an absorber section 232. The stripper section 230 includes a plurality of stripper units 234 and an equal plurality of absorber units 236. Each stripper unit 234 includes a waste water supply line 238, a vortex water gas separator 240 and a stripped water reservoir 242. Each stripper unit 234 is connected to an absorber unit 236 via a gas conduit 244a and gas return conduit 244b for equalizing air flow between the stripper unit and its associated absorber unit. Each absorber unit 236 includes a vortex gas water mixer 246, a mineral acid supply line 248 and an ammonium mineral acid liquor reservoir 250. The AR subsystem 224 also includes four ammonium mineral acid liquor storage tanks 252 connect to the liquor reservoirs 250 via conduits not shown. The strippers and absorbers are paired so that the ammonia-laden air is continuously feed back and forth between the stripper and absorber until the ammonia content has been reduced to desired low level. The series of coupled stripper/absorber pairs withdraw water from and discharge water to the safe path. Although acid can be introduced at all or any number of the absorber units, in certain embodiments, the acid is introduced into only a single absorber. Although the ammonium mineral acid liquor can be withdrawn from all of the absorber units, in certain embodiments, the absorber units include weirs that allow the ammonium mineral acid liquor to flow toward the first absorber in the series, which includes a weir that empties into the liquor storage reservoirs.

The AR subsystem 224 also includes an outlet 254 connected to an ammonia stripped effluent conduit 256. Effluent water from the safe path 226 is withdrawn into the stripper units 234, where an ammonia rich gas is separated via the vortex separator 240 and forwarded to its corresponding absorber unit 236 via the conduit 244, where it is reacted with a mineral acid such as sulfuric acid or nitric acid in the vortex mixer 246 to form an ammonium mineral acid salt liquor such as an ammonium sulfate or ammonium nitrate liquor. The mineral acid supply path 228 is supplied from a mineral acid tank 258 via a mineral acid supply conduit 260 into a mineral acid inlet 262. Further details of the stripper section 230 and the absorber section 236 are shown herein.

The AR subsystem 224 also includes a heating, heat exchange and heat recovery subsystem 264 includes a heating and exchange/recovery unit 266. A stream of based treated effluent is taken from the safe path 226 via a base effluent heat exchange conduit 268. The stream paths through the unit 266, where it is heated by heaters (shown in detail below) and brought into heat exchange relationship with a stream taken from the ammonia stripped effluent via an ammonia stripped heat exchange conduit 270. The unit 266 heats the base treated effluent water to a temperature optimal for ammonia stripping. In certain embodiments, the temperature is between about 40° C. and about 70° C. In other embodiments, the temperature is between about 45° C. and about 70° C. In other embodiments, the temperature is about 70° C. The unit 266 is designed to use the "hot" ammonia stripped stream to heat the in coming "cool" base treated stream to reduce the energy supplied to the heaters to increase the temperature of the in coming stream to the desired higher temperature.

The conduit 256 is connected to an inlet 272 of a denitrification subsystem 274, which uses an absorbent and microorganisms to absorb and convert nitrates, nitrites, residual ammonia/ammonium, or other nitrogen-containing compounds into nitrogen gas. The denitrification subsystem 274 includes a safe path 276, an absorber/biological denitrification section 278 and a nutrient supply section 280. The denitrification subsystem 274 also includes a waste water inlet conduit 282, a nutrient supply conduit 284 and a treated water outlet 286. The denitrification subsystem 274 also includes an outlet 288 connected to a finished effluent conduit 290.

In the denitrification subsystem 274, the effluent water from the safe path 276 is withdrawn into the absorber/biological denitrification section 278, where the nitrogen-containing compounds are absorbed by the absorbent and converted to nitrogen gas by the microorganisms. The nutrient supply section 280 supplies nutrients for the microorganisms. Further details of the absorber/biological denitrification section 278 are shown herein.

Third Embodiment

Figure 2B:
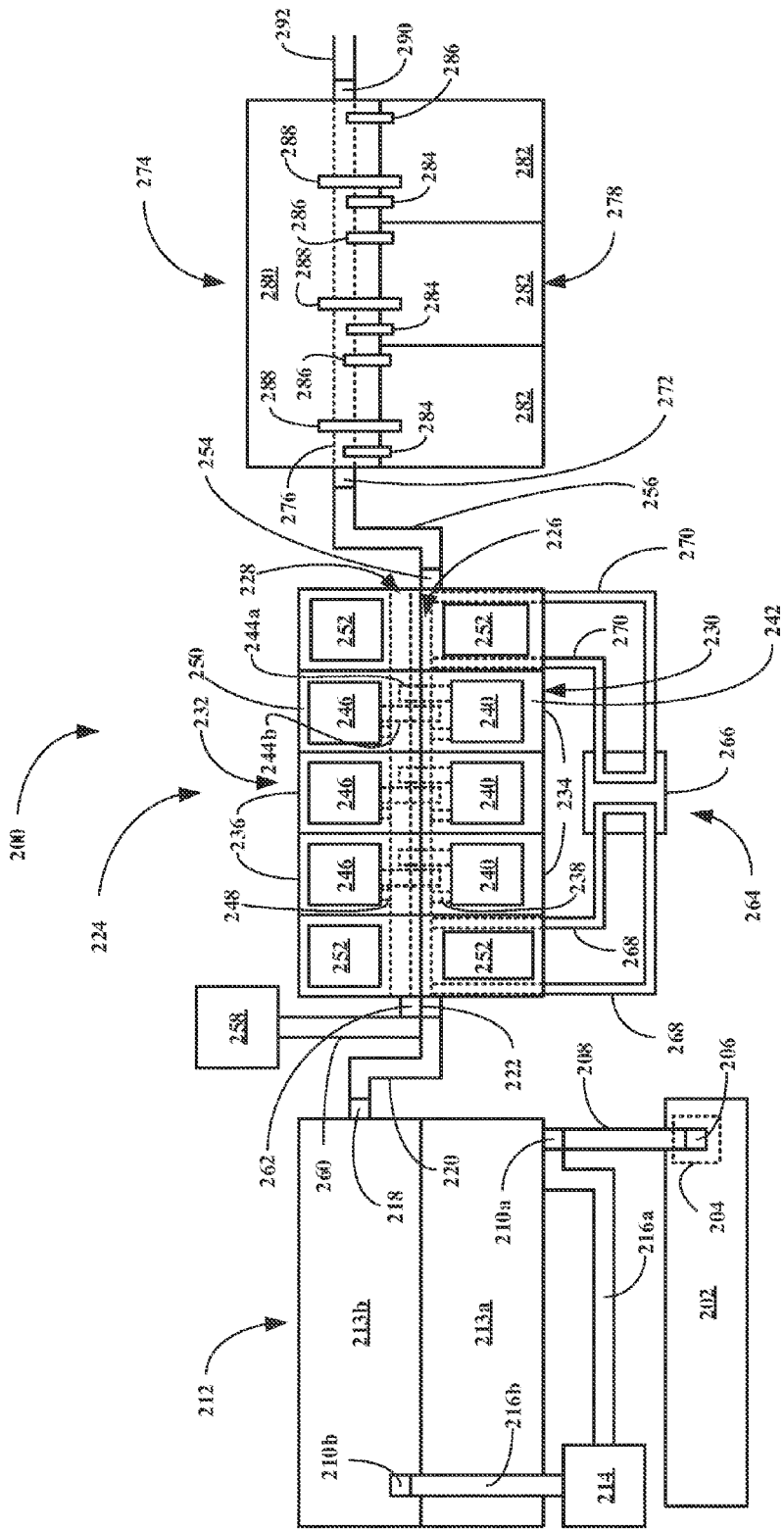
FIG. 2B depicts another embodiment of a water waster treating apparatus or facility of this invention, with a two stage precipitation subsystem.

Referring now to FIG. 2B, another embodiment of the system, generally 200, includes a source 202 of waste water such as a retention pond. The source 202 includes a sump pump 204 having an outlet 206 connected to a source input conduit 208, which in turn is connected to an inlet 210a of a first stage 213a of a precipitation and conditioning subsystem 212, sometimes referred to herein as the TCP subsystem. The precipitation and conditioning subsystem 212 includes two precipitation stages 213a and 213b. The subsystem 212 also includes a source of a base 214, which is connected to the inlet 210a by a base supply conduit 216a. The base supplied through conduit 216a mixes with the waste water in conduit 208 at the inlet 210a and is sufficient to adjust a pH of the waste water to a pH sufficient to precipitate precipitatable contaminants such as trace metal contaminants or other precipitatable contaminants. In certain embodiments, the pH in the first stage 213a of the subsystem 212 is adjusted to a pH between about 4.8 and about 8.8. In certain embodiments, the pH is adjusted to a pH of about 8. At this pH, trace metals are precipitated, but the pH is not too high to cause the precipitate to re-dissolve. The base source 214 is also connected to an inlet 210b associated with the second stag 213b of the subsystem 212 via a base supply conduit 216b. The base supplied through conduit 216b is sufficient to adjust a pH of the first stage waste water effluent to a pH sufficient to precipitate other precipitatable contaminants. In certain embodiments, the pH in the second stage 213b is adjusted to pH a value between about 9.8 and 11.0. In certain embodiments, the pH is adjusted to a value of about 10. At this pH, substantially all precipitatable contaminants are precipitated and the pH is optimal for converting ammonium in the base treated effluent into gaseous ammonia for extraction in the AR subsystem set forth herein. The subsystem 212 also includes an outlet 218 connected to a base treated effluent conduit 220.

The conduit 220 is connected to an inlet 222 of an ammonia recovery subsystem 224, sometimes referred to herein as the AR subsystem. The AR subsystem 224 includes a safe path 226, a mineral acid supply path 228, a stripper section 230 and an absorber section 232. The stripper section 230 includes a plurality of stripper units 234 (here three) and the absorber section 232 includes an equal plurality of absorber units 236 (here three). Each stripper unit 234 includes a waste water supply line 238, a vortex water gas separator 240 and a stripped water reservoir 242. Each stripper unit 234 is connected to an absorber unit 236 via a gas conduit 244a and gas return conduit 244b for equalizing air flow between the stripper unit and its associated absorber unit. Each absorber unit 236 includes a vortex gas water mixer 246, a mineral acid supply line 248 and an ammonium mineral acid liquor reservoir 250. The AR subsystem 224 also includes four ammonium mineral acid liquor storage tanks 252 connect to the liquor reservoirs 250 via conduits not shown. The AR subsystem 224 also includes an outlet 254 connected to an ammonia stripped effluent conduit 256. Effluent water from the safe path 226 is withdrawn into the stripper units 234, where an ammonia rich gas is separated via the vortex separator 240 and forwarded to its corresponding absorber unit 236 via the conduit 244, where it is reacted with a mineral acid such as sulfuric acid or nitric acid in the vortex mixer 246 to form an ammonium mineral acid salt liquor such as an ammonium sulfate or ammonium nitrate liquor. The mineral acid supply path 228 is supplied from a mineral acid tank 258 via a mineral acid supply conduit 260 into a mineral acid inlet 262. Further details of the stripper section 230 and the absorber section 232 are shown herein.

The AR subsystem 224 also includes a heating, heat exchange and heat recovery subsystem 264 includes a heating and exchange/recovery unit 266. A stream of based treated effluent is taken from the safe path 226 via a base effluent heat exchange conduit 268. The stream paths through the unit 266, where it is heated by heaters (shown in detail below) and brought into heat exchange relationship with a stream taken from the ammonia stripped effluent via an ammonia stripped heat exchange conduit 270. The unit 266 heats the base treated effluent water to a temperature optimal for ammonia stripping. In certain embodiments, the temperature is between about 40° C. and about 70° C. In other embodiments, the temperature is between about 45° C. and about 75° C. In other embodiments, the temperature is about 70° C. The unit 266 is designed to use the "hot" ammonia stripped stream to heat the in coming "cool" base treated stream to reduce the energy supplied to the heaters to increase the temperature of the in coming stream to the desired higher temperature.

The conduit 256 is connected to an inlet 272 of a denitrification subsystem 274, which uses an absorbent and microorganisms to absorb and convert nitrates and nitrites into nitrogen gas and consumes residual ammonia/ammonium, or other nitrogen-containing compound. The denitrification subsystem 274 includes a safe path 276, an absorber/biological denitrification section 278 and a nutrient supply section 280. The dentrification section 278 include a plurality of absorbent/microorganism denitrification units 282, here three denitrification units. Each unit 282 includes a water inlet conduit 284, a water outlet conduit 286 and a nutrient inlet conduit 288. The water inlet conduit 284 withdraws water from the safe path 276 into the unit 282, while the water outlet conduit 286 returns denitrified water to the safe path 276. The nutrient inlet conduit 288 supplies microorganism nutrients from the nutrient supply section 280 to the units 282. The denitrification subsystem 274 includes an outlet 290 connected to a finished effluent conduit 292.

In the denitrification subsystem 274, effluent water from the safe path 276 is withdrawn into the absorber/biological denitrification units 282, where the nitrogen-containing compounds are absorbed by the absorbent and converted to nitrogen gas by the microorganisms. The nutrient supply section 280 supplies nutrients for the microorganisms. Further details of the absorber/biological denitrification section 278 are shown herein.

Fourth Embodiment

Figure 3A:
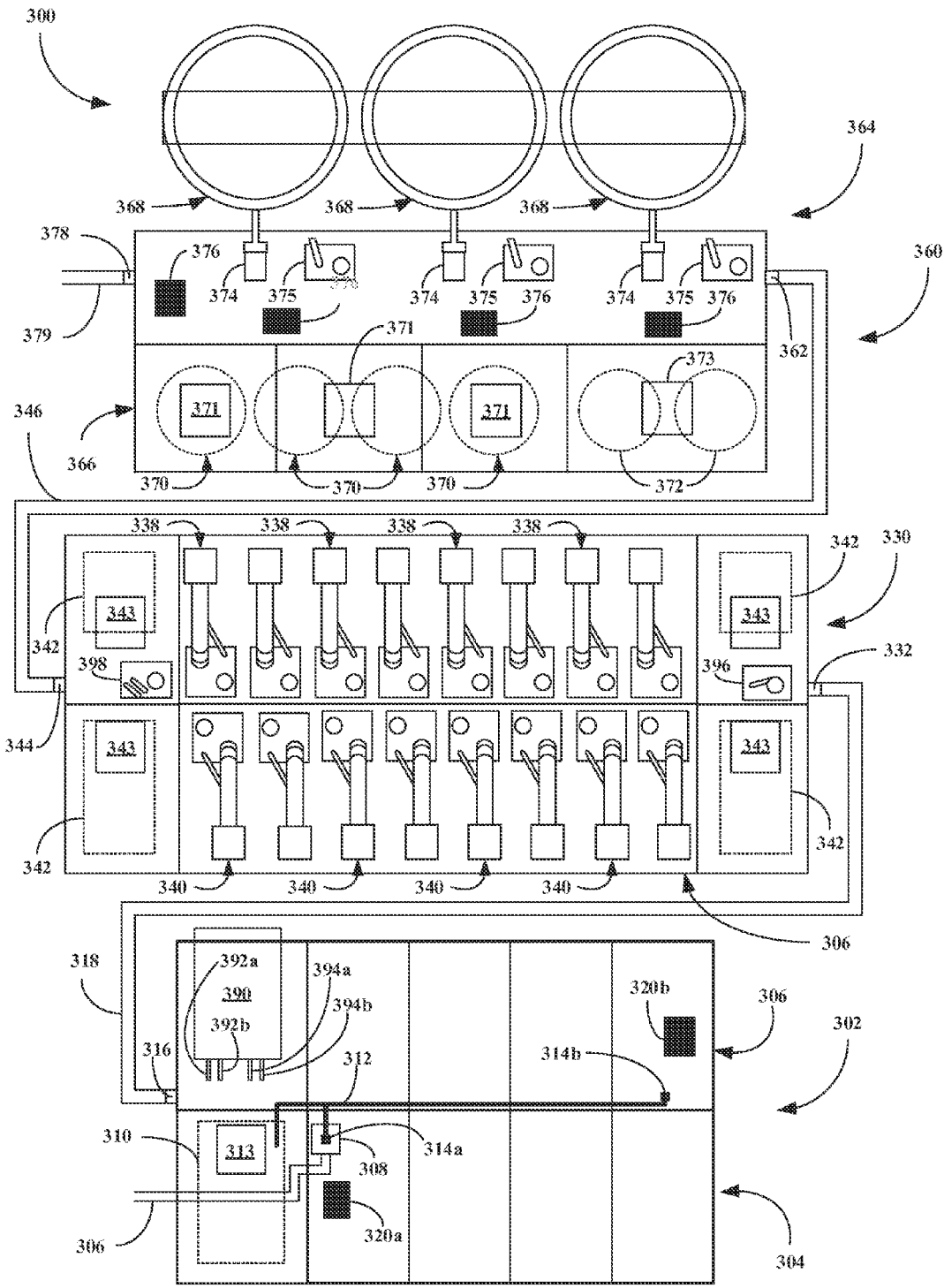
FIGS. 3A&B depict another embodiment of a water waster treating apparatus or facility of this invention.

Referring now to FIG. 3A, another embodiment of the system, generally 300, include of a two stage precipitation and conditioning subsystem 302, sometimes referred to herein as the TCP subsystem, having a first stage 304a, sometimes referred to as TCP1 and a second stage 304b, sometimes referred to as TCP2. The subsystem 302 also includes a waste water input conduit 306 connected to an inlet 308 to the first stage 304a. The subsystem 302 also includes a base reservoir 310 having a base supply conduit 312 and an access hatch 313. The base supply conduit 312 supplies base through a base outlet 314a to the inlet 308. Sufficient base is added to the inlet 308 to adjust a pH of the waste water to a pH sufficient to precipitate precipitatable trace metal contaminants. In certain embodiments, the pH in the first stage 304a is adjusted to a pH between about 7.5 to about 8.5. In other embodiments, the pH is adjusted to about 8. At this pH, trace metals are precipitated, but the pH is not too high to cause the precipitate to re-dissolve. The base conduit 312 also supplies base to the second stag 304b at a second base outlet 314b. The base supplied through the second outlet 314b is sufficient to adjust a pH of the waste water leaving TCP1 304a to a pH sufficient to precipitate other precipitatable contaminants. In certain embodiments, the pH in the second stage 304b is adjusted to pH 10. At this pH, substantially all precipitatable contaminants are precipitated and the pH is optimal for converting ammonium salts into gaseous ammonia for extraction and recovery in the AR subsystem set for herein. The subsystem 302 also includes an outlet 316 connected to a base treated effluent conduit 318. TCP1 304a also includes a hatch 320a for removing precipitate periodically therefrom. TCP2 304b also includes a hatch 320b for removing precipitate periodically therefrom.

The conduit 320 is connected to an ammonia recovery subsystem 330 at an inlet 332. The subsystem 330 is sometimes referred to herein as the AR subsystem. The AR subsystem 330 includes a stripper section 334 and an absorber section 336. The stripper section 334 includes a plurality of stripper units 338 (here eight), and the absorber section 336 includes an equal plurality of absorber units 340 (here eight). The stripper units 338 and the absorber units 340 are described in greater detail herein. The AR subsystem 330 also includes four ammonium mineral acid liquor storage zones 342 for storage of the ammonium mineral acid liquor and corresponding hatches 343 to remove the liquor. The AR subsystem 330 includes an outlet 344 connected to an ammonia stripped effluent conduit 346.

The conduit 346 is connected to a denitrification subsystem 360 at an inlet 362, which uses an absorbent and microorganisms to absorb and convert nitrates, nitrites, residual ammonia/ammonium, or other nitrogen-containing compound into nitrogen gas. The denitrification subsystem 360 includes an absorber/biological denitrification section 364 and a nutrient supply section 366. The absorber/biological denitrification section 364 includes a plurality of absorber/biological denitrification units 368. The nutrient supply section 366 includes microorganism nutrients tanks 370 and associated hatches 371 for filling the tanks. The nutrient supply section 366 also includes mineral acid tanks 372 and associated hatches 373 for filling the tank. The mineral acid is used in the AR subsystem and in the denitrification subsystem. In the AR subsystem, the mineral acid is used to convert ammonia gas into the ammonium mineral acid salt liquor. In the denitrification subsystem, the mineral acid is used to adjust the pH to the optimal pH for supporting the microorganisms used to convert nitrogen-containing oxide, residue ammonia and other species into nitrogen gas. The denitrification section 364 includes media lift pump assemblies 374 for supplying waste water to the units 368 and recirculation pump assemblies 375 for supplying nutrients to the units 368. The denitrification section 364 also includes access hatches 376. The denitrification subsystem 360 includes an outlet 378 connected to a finished effluent conduit 379.

The system 300 also includes a heating, heat exchange and heat recovery subsystem 390 having a base treated water inlet 392a, a heated base treated water outlet 392b, a hot ammonia stripped water inlet 394a and a cooled ammonia stripped water outlet 394b. The subsystem 390 also includes a base treated water supply and return unit 396 and an ammonia stripped water supply and return unit 398. The subsystem 390 heats the base treated water before entering the stripper units 334 and the absorber units 340. The water is heated to a temperature optimal for ammonia gas removal in the stripper units 334. In certain embodiments, the temperature is about 50° C. Before the water is discharged in the denitrification subsystem 360, the water is cooled by transferring a portion of its heat to heat the base treated water as it enters the AR subsystem. Thus, the combination of heating and heat recovery is used to heat the base treated water at it enters the AR subsystem. The subsystem 390 is described in more detail herein.

Figure 3B:
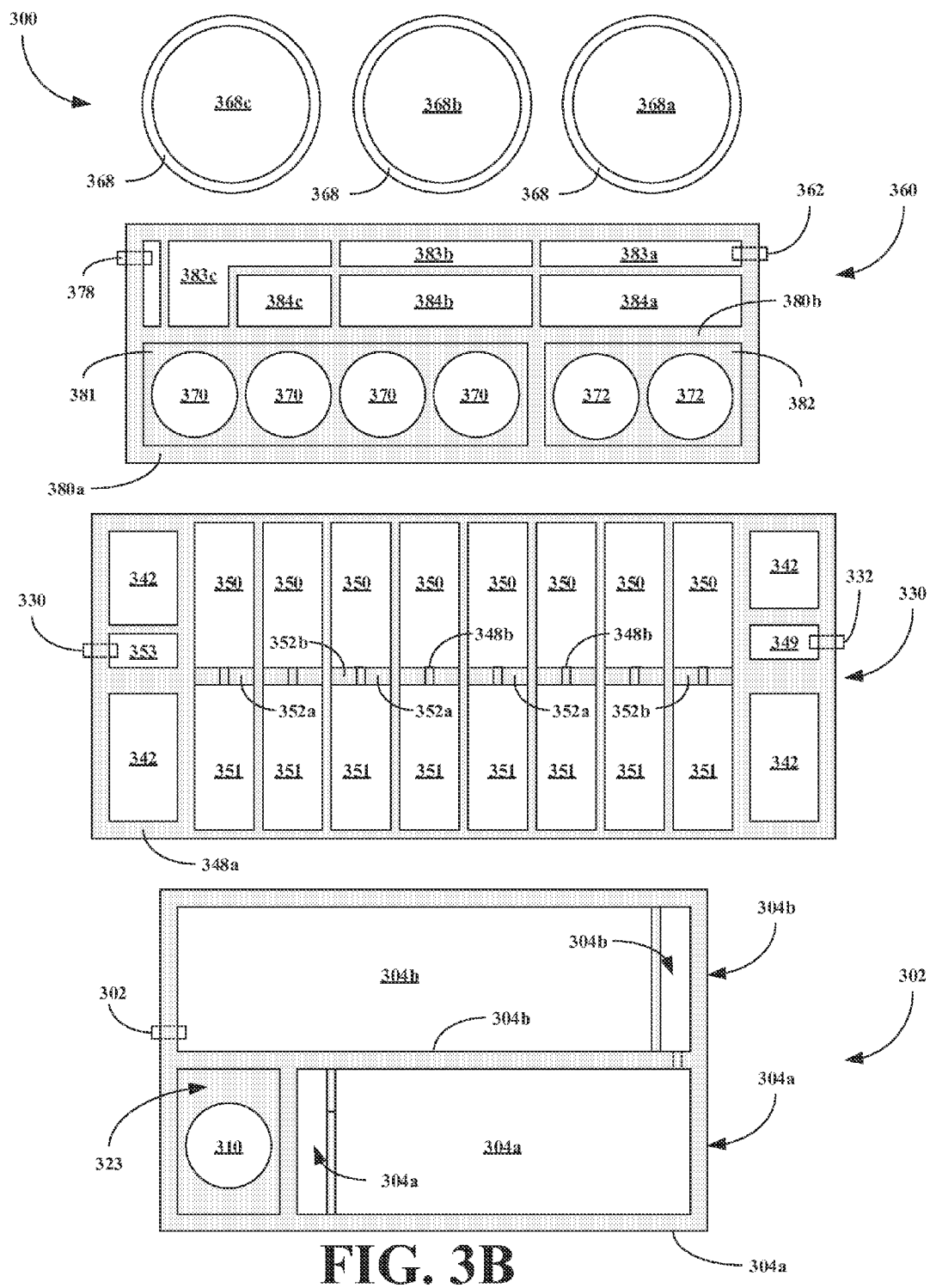

Referring now to FIG. 3B, the embodiment of the system of FIG. 3A, generally 300, is shown absent in covering and equipment. The system 300 includes the subsystem precipitation and conditioning subsystem 302, the AR subsystem 330, and the denitrification subsystem 360. The subsystem 302 is shown to include outer and inner walls 322a&b. The subsystem 302 also include a base tank enclosure 323 housing the base tank 310. The subsystem 302 also include a first flocculent tunnel 324a associated with the first stage 304a and located at the inlet 308. The flocculent tunnel 324a provides efficient mixing of the waste water and the base to facilitate precipitation of the trace metals and other contaminants that precipitate at a pH of about 8. The subsystem 302 also includes a first stage precipitate enclosure/reservoir 325a, where the pH 8 precipitates settle. The subsystem 302 also includes transfer conduit 326, which allows water to flow from the enclosure 325a to a second flocculent tunnel 324b associated with the second stage 304b and located at the second base outlet 314b and the transfer conduit 326. Like the first flocculent tunnel 324a, the second flocculent tunnel 324b provides efficient mixing of the waste water and the base to facilitate precipitation of the trace metals and other contaminants that precipitate at a pH of about 10. The subsystem 302 also includes a second stage precipitate enclosure/reservoir 325b, where the pH 10 precipitates settle. The reservoirs 325a&b are of sufficient length and the transfer conduit 326 and the outlet 316 are of sufficient height from a bottom of the reservoirs 325a&b to insure that all or substantially all of the precipitate formed settles in the reservoirs. The term "substantially" as used here means that the effluent water includes less than about 10 wt. % precipitate. In certain embodiments, substantially shall mean that the effluent water includes less than 5 wt. % precipitate. In certain embodiments, substantially shall mean that the effluent water includes less than 2.5 wt. % precipitate. In certain embodiments, substantially shall mean that the effluent water includes less than 1 wt. % precipitate.

The ammonia recovery (AR) subsystem 330 includes outer and inner walls 348a&b. The subsystem 330 also includes a base treated water input reservoir 349 into which the inlet 332 empties the base treated water and associated with the supply and return unit 396 of the subsystem 390. The subsystem 330 also includes a plurality of stripper unit enclosures/reservoirs 350 (eight here) and an equal plurality of absorber unit enclosures/reservoirs 351. The subsystem 330 also includes a first groove 352a in the inner wall 348b for receiving the air conduit 244a and a second groove 352b for receiving the air conduit 244b. The subsystem 330 also includes the ammonium mineral acid enclosure/reservoirs 342. The subsystem 330 also includes an ammonia stripped outlet reservoir 353 out of which the ammonia stripper water flow out of the outlet 334 and associated with the supply and return unit 398.

The denitrification subsystem 360 includes outer and inner walls 380a&b. The subsystem 360 also includes a nutrient enclosure 381 of the nutrient section 366 housing the nutrient tanks 370 and a mineral acid enclosure 382 of the nutrient section 366 housing the mineral acid tanks 372. The subsystem 360. The subsystem 360 also includes safe paths 383a-c, one for each absorber/biological denitrification section 368. The paths 383a-c are associated with the recirculation pump assemblies 375. The subsystem 360 also includes auxiliary safe paths 384a-c for use with an optional final treatment subsystem (not shown) if needed to bring the denitrified water into final compliance with appropriate federal, state and local governmental regulations. The subsystem 360 also includes a discharge enclosure/reservoir 386 connected to the outlet 378.

Detailed Description of TCP Subsystem

Figure 4A:
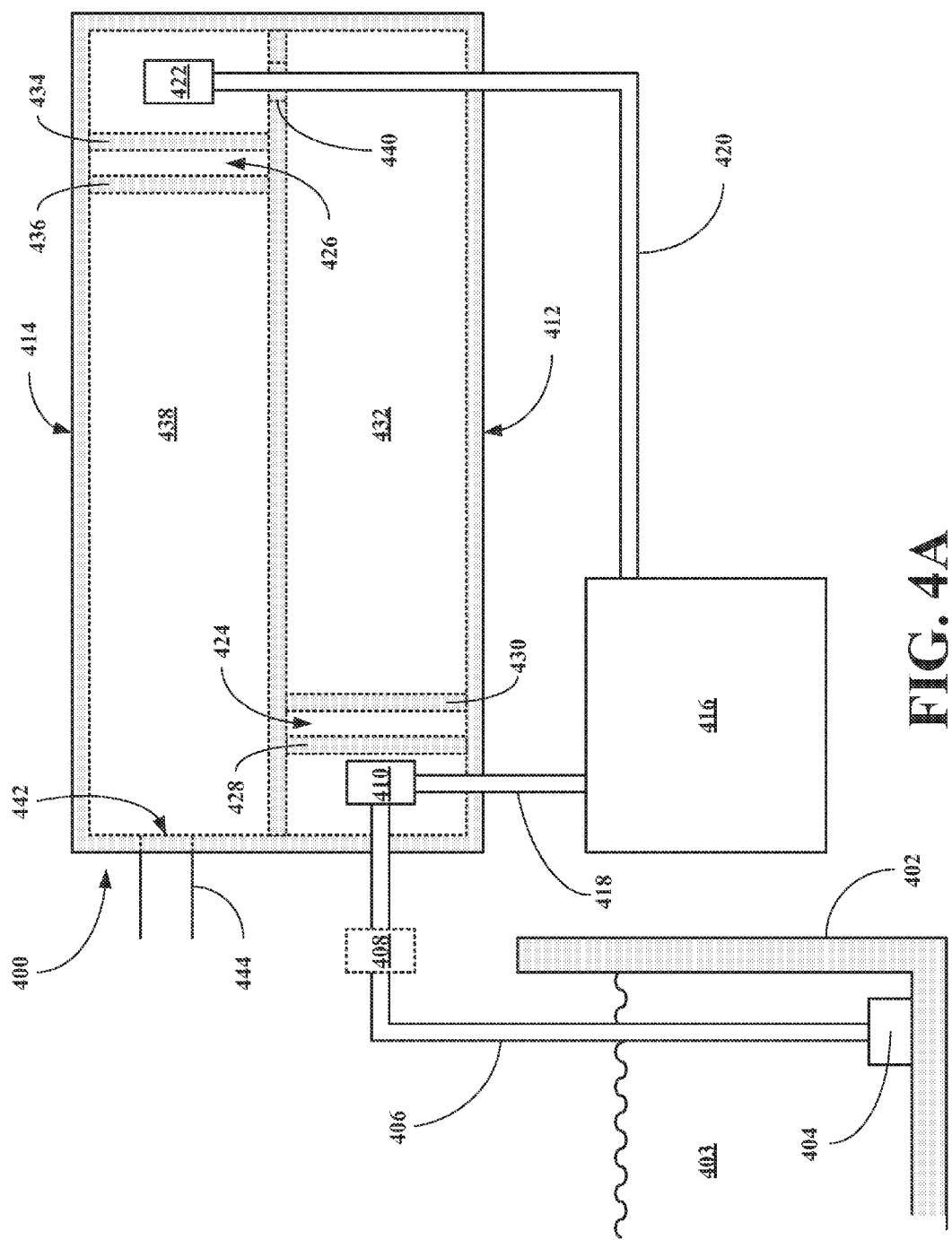
FIGS. 4A-C depict an embodiment of a two stage precipitation subsystem of this invention.

Referring now to FIG. 4A, an embodiment of the precipitation and conditioning subsystem, generally 400, is show to include a source 402 of waste water 403 such as a retention pond. The source 402 includes a sump pump 404 connected to a waste water input conduit 406. The subsystem 400 can also include an optional aeration unit 408, which aerates the incoming waste water 403 to a desired input condition. The subsystem 400 also includes an inlet 410 of associated with a first precipitation stage 412. The subsystem 400 also includes a second precipitation stage 414. The subsystem 400 includes a source of a base 416, which is connected to the inlet 410 by a first base supply conduit 418. The base supplied through the conduit 418 mixes with the waste water 403 entering through the conduit 406 at the inlet 410 and is sufficient to adjust a pH of the incoming waste water to a pH sufficient to precipitate precipitatable contaminants such as trace metal contaminants or other precipitatable contaminants. In certain embodiments, the pH in the first stage 412 of the subsystem 400 is adjusted to a pH between about 7.5 and about 8.5. In certain embodiments, the pH is adjusted to a pH of about 8. At this pH, trace metals are precipitated, but the pH is not too high to cause any or substantially any of the precipitate to re-dissolve. The base source 416 is also connected to a second base supply conduit 420, which is connected to an base outlet 422 associated with the second stage 414. The base supplied through conduit 420 is sufficient to adjust a pH of the first stage waste water effluent to a pH sufficient to precipitate other precipitatable contaminants. In certain embodiments, the pH in the second stage 414 is adjusted to pH a value between about 9.5 and 10.5. In certain embodiments, the pH is adjusted to a value of about 10. At this pH, substantially all precipitatable contaminants are precipitated and the pH is optimal for converting ammonium in the base treated effluent into gaseous ammonia for extraction in the AR subsystem set forth herein.

The subsystem 400 also includes a first flocculent tunnel 424 associated with the first stage 412 and located so that the inlet 410 empties into the tunnel 424. The tunnel 424 is adapted to provide sufficient mixing of the base and the entering waste water so facilitate precipitation formation. The subsystem 400 also includes a second flocculent tunnel 426 associated with the second stage 414 and located so that the outlet 422 empties into the tunnel 426. The tunnel 426 is adapted to provide sufficient mixing of the base and the entering waste water so facilitate precipitation formation. The first flocculent tunnel 424 is formed by a first downward extending wall 428 and a first upward extending wall 430. After passing through the first flocculent tunnel 424, the first base treated water flows into a precipitation settling zone or reservoir 432.

The second flocculent tunnel 426 is formed by a second downward extending wall 434 and a second upward extending wall 436. After passing through the second flocculent tunnel 426, the second base treated water flows into a precipitation settling zone or reservoir 438. The subsystem 400 also includes a transfer conduit 440 from the first stage 412 to the second state 414. The subsystem 400 also includes an base treated waste water outlet 442 connected to a base treated waste water conduit 444, which forwards base treated water to the AR subsystem described below.

The optional aerator unit is adapted to adjust oxygen content of the waste water prior to pumping the waster water into the precipitation unit. As the waste water is pumped into the precipitation unit, sufficient caustic is added to raise a pH of the water to a pH sufficient to precipitate some to substantially all precipitatable components in the waste water. The precipitation unit includes a precipitate retention zone and an outlet. Precipitate free or substantially precipitate free water is forwarded to the ammonia stripping unit. In certain embodiments, the precipitation zone is defined between baffles that permit precipitate free or substantially precipitate free water to flow in into the outlet. In other embodiments, the precipitation unit include at least two precipitation zone. Caustic is added to each zone. Sufficient caustic is added to waste water as it enters each zone to adjust the pH to a desired pH to affect a given precipitation. In certain embodiments, sufficient caustic is added to the first zone to raise the pH of the waste water to about pH 8. At this pH, certain metals precipitate as oxide or hydroxides. As the waster water enters the second zone, sufficient caustic is added to raise the pH of the waste water to about pH 10. At pH 10 other contaminants precipitate. Each zone is baffled so that as the water flows through the zone, precipitate settles in the area between the baffles and water free or substantially free of the precipitated solid in the stages spills over the baffle and either into the next zone or into the output of the unit. The water exiting the precipitation unit will have a desired pH optimized for ammonia stripping.

The subsystem 400 also includes pH monitors used to measure pH at various points to control a rate of caustic input relative to a rate of waste water being pump into the subsystem 400. The monitors permit the pH of water in each stage of the subsystem to be monitored so that base treatment can be adjusted continuously, semi-continuously or periodically to insure optimal base treatment of the waste water.

Figure 4B:
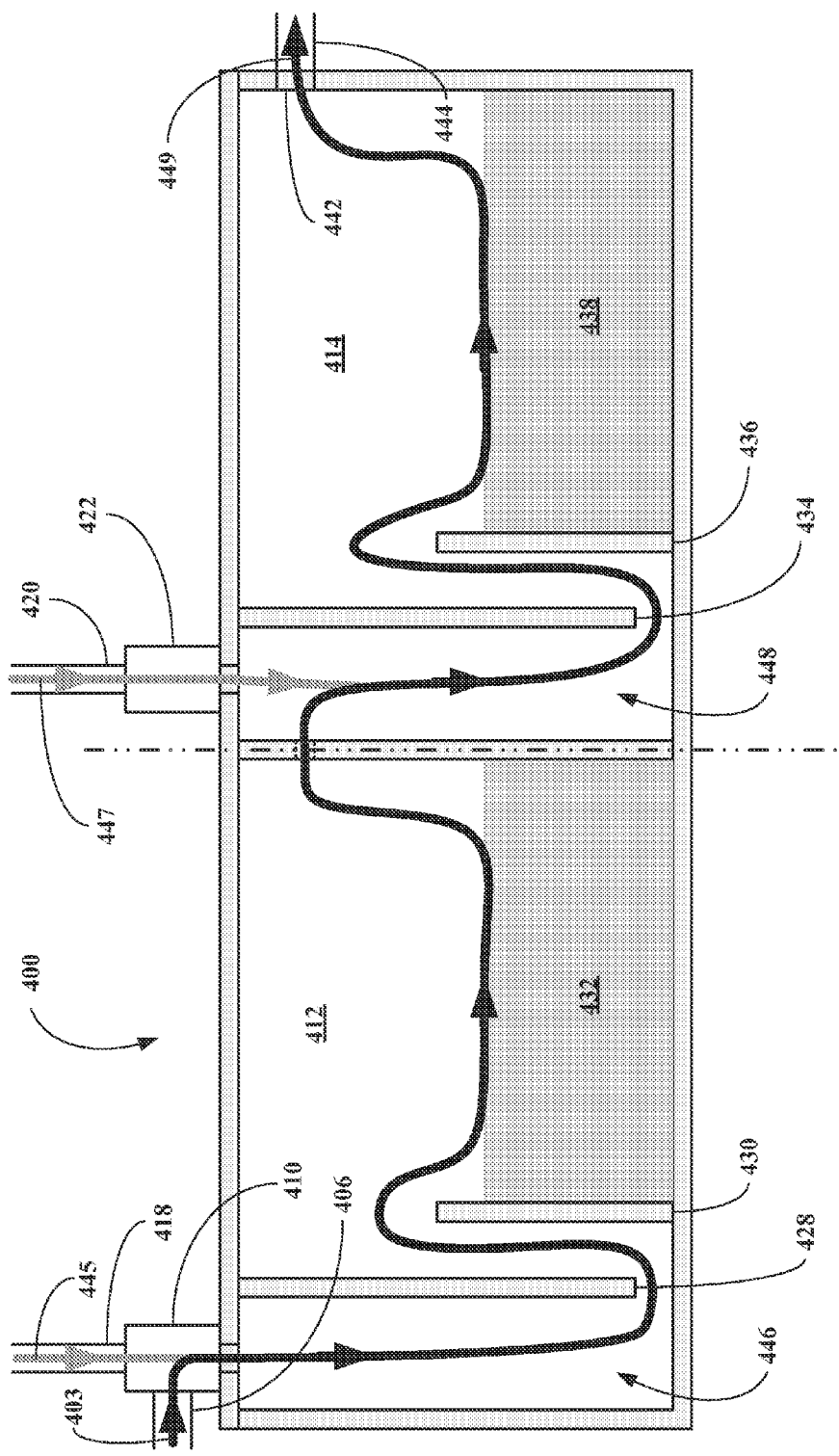

Referring now to FIG. 4B, the embodiment of FIG. 4A is shown in a linear cross-sectional to show the water and base flow in the subsystem 400. The water 403 enters the subsystem 400 through the inlet 410 along with a first amount of base 445. The base 445 and the water 403 mix in a mixing zone 446 of the first stage 412 and then enter into the first flocculent tunnel 424 formed from the walls 428 and 430. The water 403 then flows through the remainder of the first stage 412 and precipitate collects in the precipitate zone 432. The waster 403 then flows into a second mixing zone 448 of the second stage 414, where a second amount of base 447 is added. The water 403 and the base 448 then enter into the second flocculent tunnel 426 formed from the walls 434 and 436. The water 403 then flows then through the remainder of the second stage 412 and precipitate collects in the precipitate zone 438 to form a base treated water 449, which exits through the outlet 442 through the conduit 444.

Figure 4C:
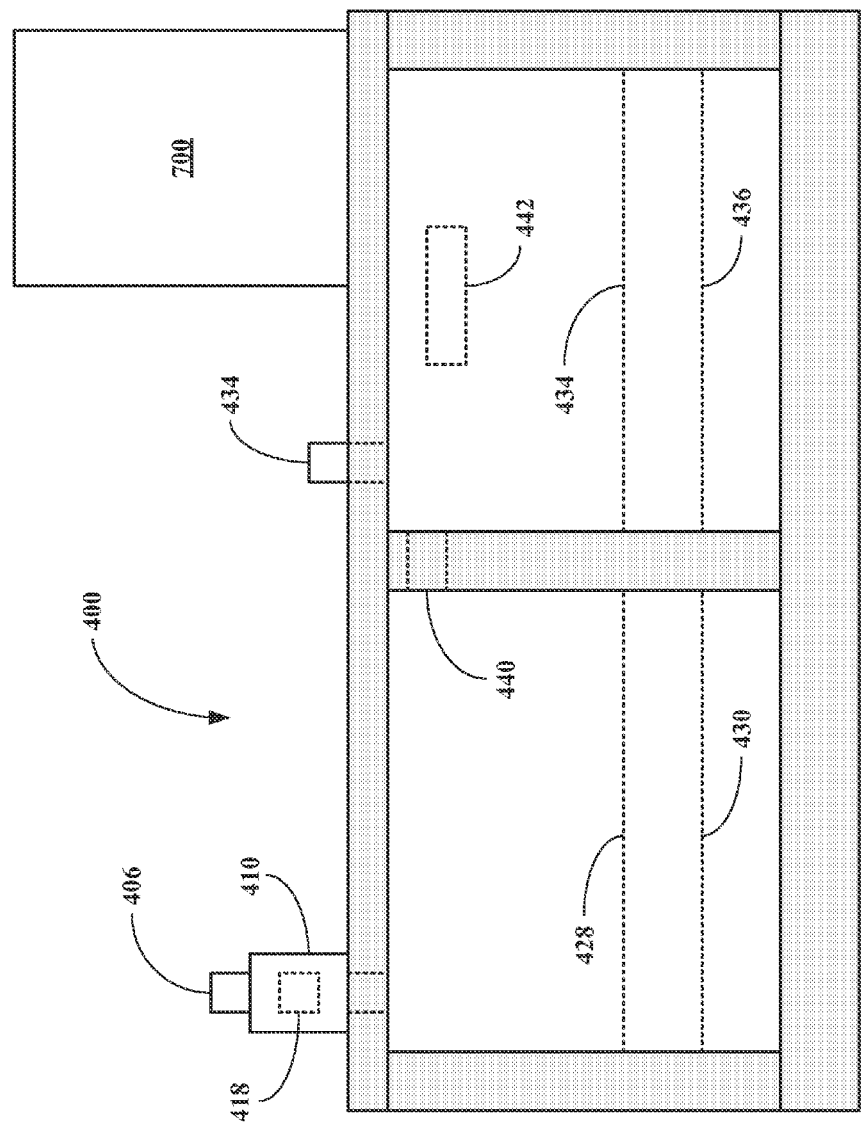

Referring now to FIG. 4C, the embodiment of FIG. 4A is shown in a side view. On the top of the subsystem 400 is positioned the heating, heat exchange and recovery subsystem 700 disclosed below.

Detailed Description of AR Subsystem

Figure 5A:
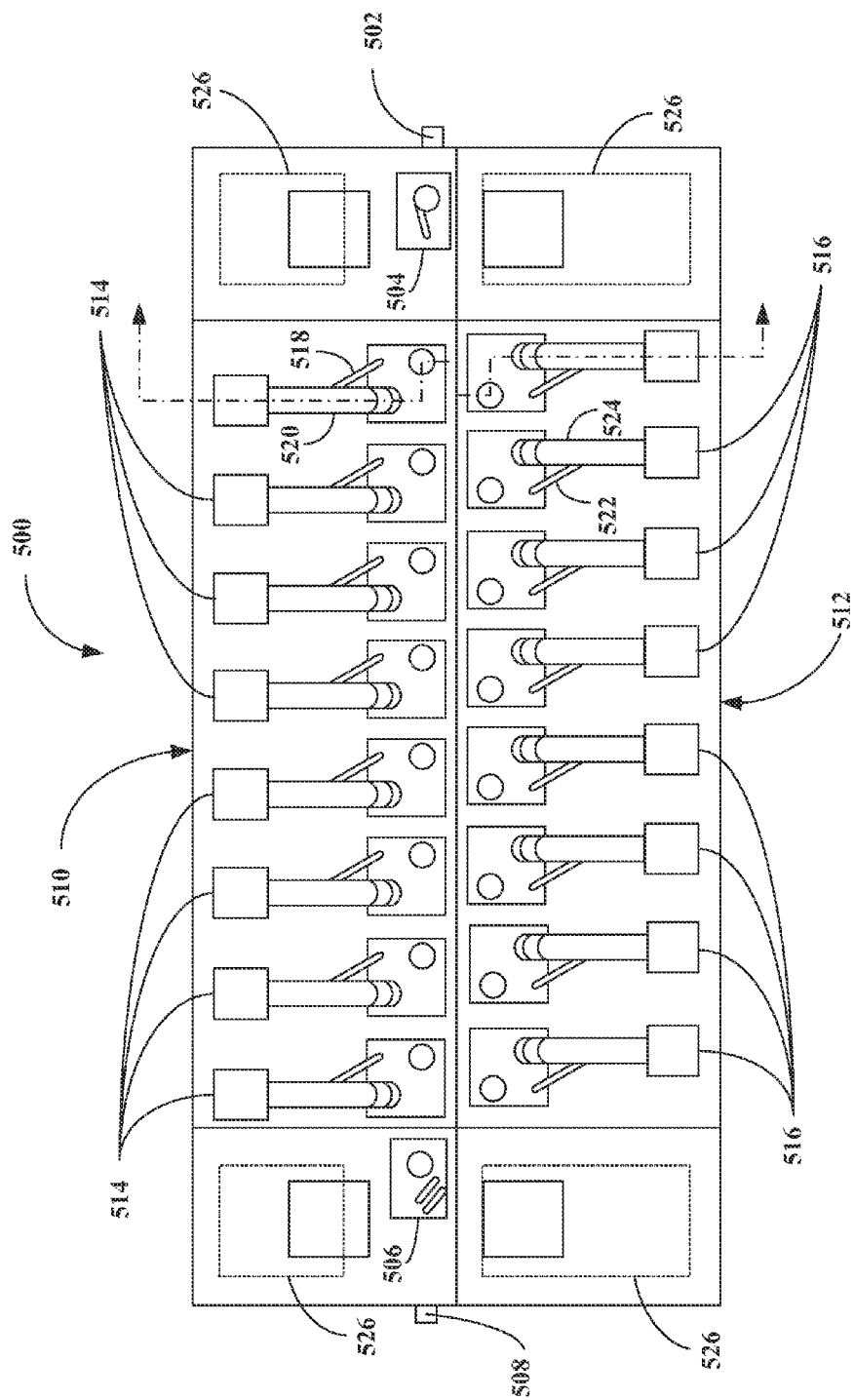
Figure 5E:
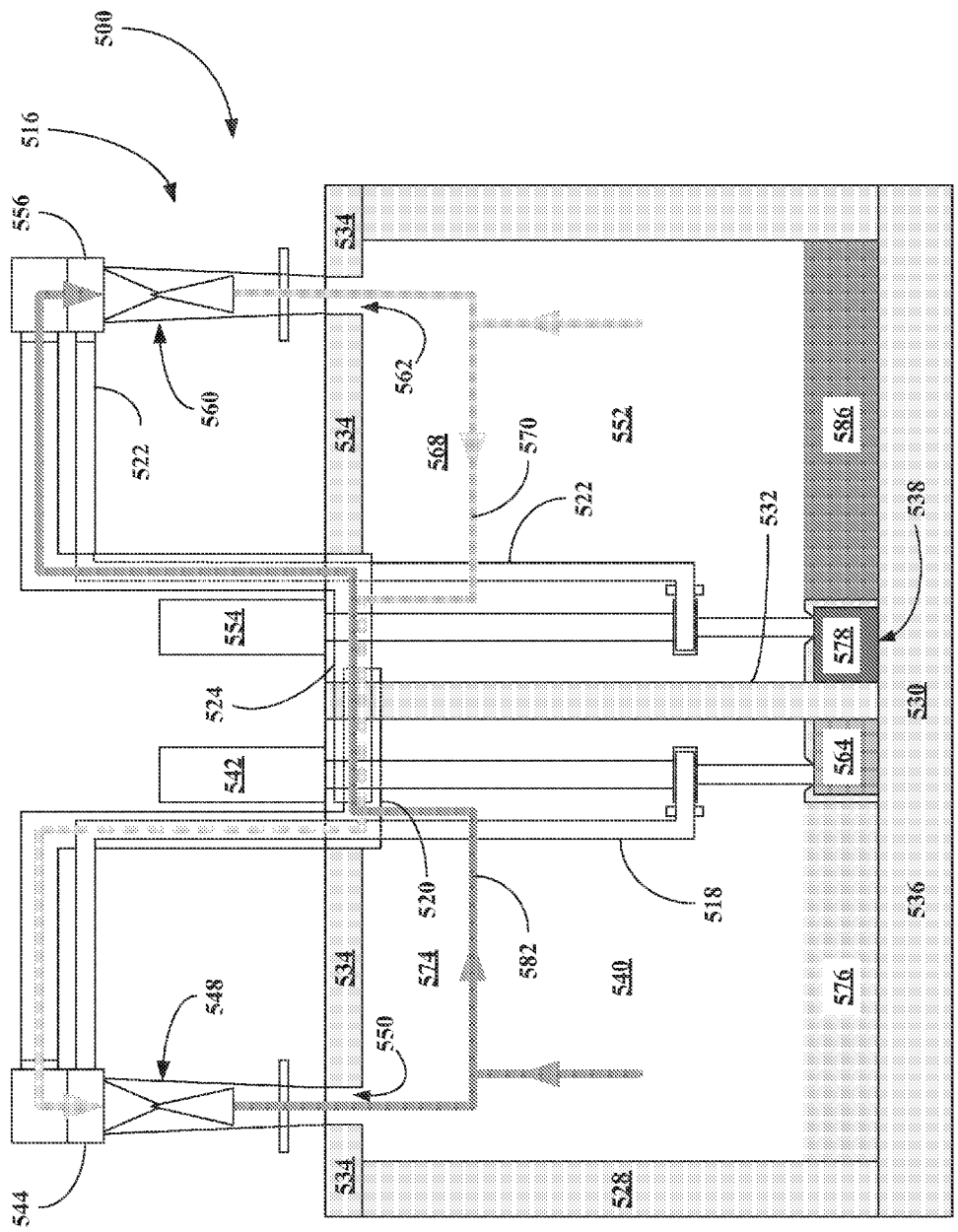

Referring now to FIG. 5A, an embodiment of the AR subsystem, generally 500, is show to include an inlet 502, an incoming supply and return unit 504, an outgoing supply and return unit 506, an outlet 508, a stripper section 510, and an absorber section 512. The stripper section 510 includes a plurality of stripper units 514 (here eight) and the absorber section 512 includes an equal plurality of absorber units 516 (here eight). Each stripper unit 514 includes a waste water supply line 518 and a stripper gas supply line 520. Each absorber unit 516 includes a mineral acid supply line 522 and an absorber gas supply line 524. The AR subsystem 500 also includes four ammonium mineral acid liquor storage tanks 526 for storage of the ammonium mineral acid liquor.

Referring now to FIGS. 5B&C, a view of a stripper unit 514 and its corresponding absorber unit 516 is shown. Each stripper unit 514 is paired with an absorber unit 516 so that ammonia gas separated from the waste water in the stripper unit 514 can be transferred to the absorber unit 516 for reacting with the mineral acid to form an ammonium mineral acid liquor. The subsystem 500 includes outer walls 528, a bottom 530, inner walls 532 and top walls 534. The subsystem 500 also includes a waste water safe path or conduit 536 and a mineral acid supply conduit 538. The stripper unit 514 includes a stripper enclosure 540, a stripper pump 542, the waste water supply line 518 connected to a liquid inlet 544, the stripper gas supply line 520 connected to a gas inlet 546, and a stripper vortex mixing zone 548. After passing through the vortex mixing zone 548, the resulting effluent exits through a stripper orifice 550 opening into the enclosure 540. The absorber unit 516 includes an absorber enclosure 552, an absorber pump 554, the mineral acid supply line 522 connected to a gas inlet 556, the absorber gas supply line 524 connected to a gas outlet 558, and an absorber vortex mixing zone 560. After passing through the vortex mixing zone 560, the resulting effluent exits through an absorber orifice 562 opening into the enclosure 552.

Referring now to FIGS. 5D&E, waster water 564 is pumped from the conduit 536 into the line 518 as a waste water flow 566 and directed into the stripper vortex mixing zone 548, where the waste water 566 flowing into the vortex mixing zone 548 draws an ammonia deplete gas 568 from the absorber enclosure 552 as an ammonia depleted gas flow 570. In the stripper vortex mixing zone 548, ammonia gas entrained in the waste water 566 is separated producing an ammonia stripped waste water 572 and an ammonia rich gas 574, both exiting the orifice 550. The water 572 flows into the enclosure 540 and collects in an ammonia stripped waste water reservoir 576.

Mineral acid 578 is pumped from the conduit 538 into the line 522 as a mineral acid flow 580 and directed into the absorber vortex mixing zone 560, where the mineral acid 580 flowing into the absorber vortex mixing zone 560 draws the ammonia rich gas 574 from the stripper enclosure 540 as an ammonia rich gas flow 582. In the absorber vortex mixing zone 560, ammonia gas in the ammonia rich gas 582 reacts with the mineral acid in the mineral acid flow 580 producing an ammonium mineral acid salt liquor 584 and the ammonia depleted gas 570, both exiting the orifice 562. The ammonium mineral acid salt liquor 584 flows into the enclosure 552 and collects in an ammonia stripped waste water reservoir 586.

Referring now to FIG. 5F, another embodiment of the AR subsystem, generally 500, is show to include an inlet 502, an incoming supply and return unit 504, an outgoing supply and return unit 506, an outlet 508, a stripper section 510, and an absorber section 512. The stripper section 510 includes a plurality of stripper units 514a-h (here eight) and the absorber section 512 includes an equal plurality of absorber units 516a-h (here eight). Each stripper unit 514 includes a waste water supply line 518 and a stripper gas supply line 520. Each absorber unit 516 includes a waste water supply line 522 and an absorber gas supply line 524. The AR subsystem 500 also includes four ammonium mineral acid liquor storage tanks 526 for storage of the ammonium mineral acid liquor. The AR subsystem 500 also includes a first interconnecting conduit 588 connecting the second absorber 516b to the eighth absorber 516h. The AR subsystem 500 also includes a second interconnecting conduit 590 connecting the first absorber 516a and the eighth absorber 516h, where the flow from the first absorber 516a and the eighth absorber 516h is controlled by a control valve 591. The AR subsystem 500 also includes a mineral acid supply conduit 592, which connects an acid source (not shown) to the vortex mixing 548 of the second absorber 516b. All mineral acid is added via the mineral acid conduit 592 at a rate to maintain the pH in the second absorber 516b at a pH of about 2. All ammonium mineral acid flows out of the first absorber 516a into the storage areas via a weir 594. The interconnecting conduits 588 and 590 are designed to permit control of the overall ammonia stripping and absorption from the coupled stripper and absorber units 514a-h and 516a-h, where the stripper 514a is paired with the absorber 516a. The AR subsystem 500 is designed so that the eight paired stripper/absorber units exchange ammonium mineral acid liquor so that all the liquor exits the AR subsystem 500 via a weir 594 into the storage containers 526. The AR subsystem 500 also include a clean water makeup conduit 596 connected from the outlet 604 of the denitrification unit 600 and controlled by a control valve 597. The make up water is used to reduce the density of the liquor in the first absorber 516a. In certain embodiments, the mineral acid is sulfuric acid and the liquor is ammonium sulfate. In these embodiments, the pH of ammonium sulfate is 5.5 so that the overall ammonia stripping can be controlled by monitoring the pH is the first absorber 516a and the pH in the second absorber 516b where acid is added to maintain a pH is the second absorber 516b at about 2. Of course, the pH in the other absorbers will vary between pH 2 and pH 5.5 depending on the ammonia content in the water.

Detailed Description of Denitrification Subsystem

Figure 6A:
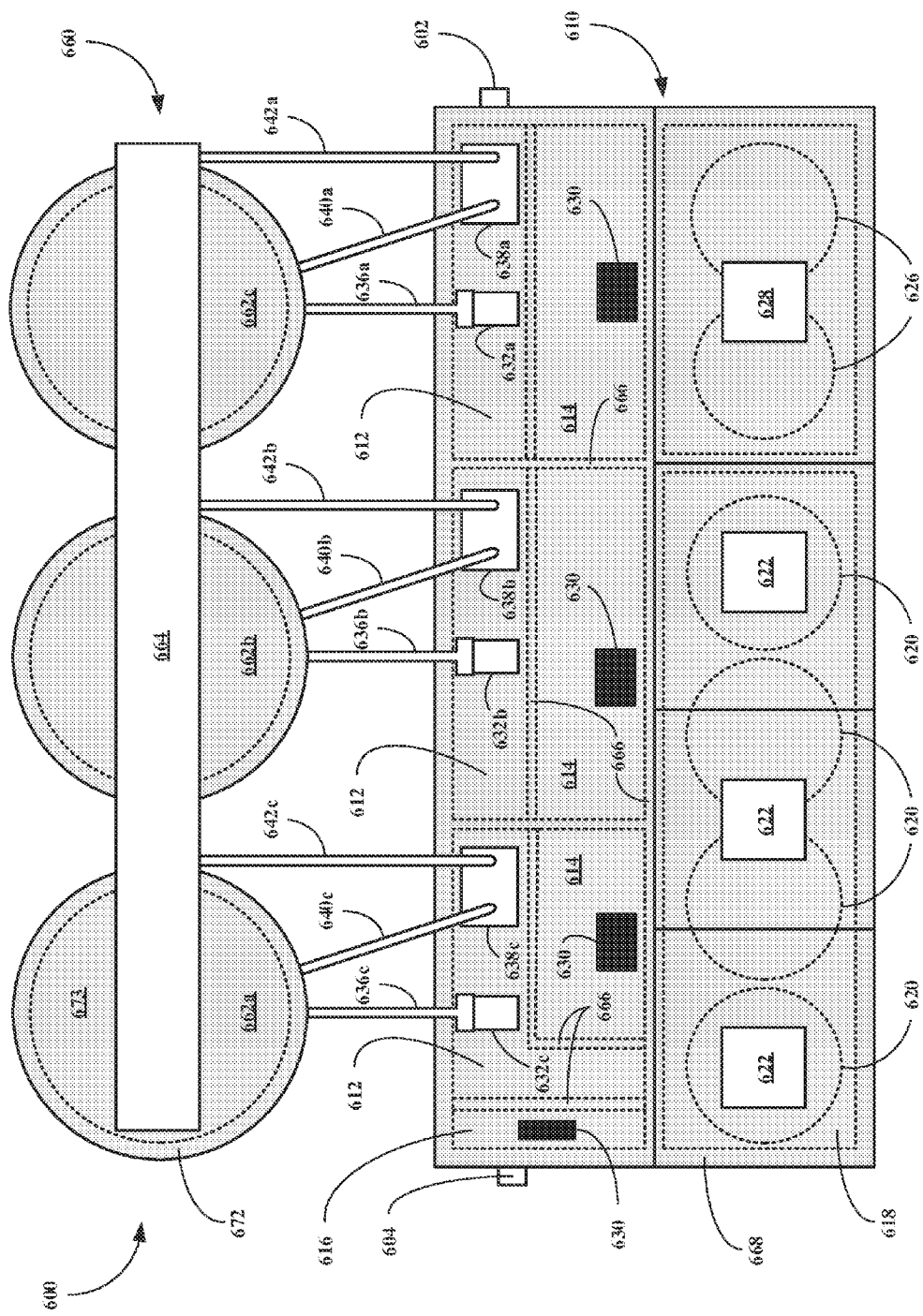

Referring now to FIGS. 6A&B, an embodiment of the denitrification subsystem, generally 600, is shown to include an inlet 602 and an outlet 604. The subsystem 600 includes a water and nutrient supply section 610 and an absorber/biological denitrification section 660.

The water and nutrient supply section 610 includes a safe path 612, optional final stage treating compartments 614 and an exit enclosure 616. The section 610 also includes a microorganism nutrient tank enclosure 618 including four microorganism nutrient tanks 620 and three access covers 622. The section 610 also includes an mineral acid enclosure 624 including two mineral acid tanks 626 and an access cover 628. The mineral acid from the tanks 626 are used in the AR subsystem to neutralize the ammonia and in the gentrification subsystem to adjust the pH of the waste water to a pH optimal for microorganism growth and stability. The section 610 also include access covers 630.

The water and nutrient supply section 610 further includes three medium uplift pumps 632a-c connected to a medium collection conduit 634a-c (see FIG. 6C) and a medium supply conduit 636a-c. The section 610 also includes a waster water and nutrient supply and recirculation pump 638a-c connected to a nitrogen rich waster water and nutrient supply conduit 640a-c and a nitrogen lean water return conduit 642a-c.

The absorber/biological denitrification section 660 include three denitrification units 662*a-c* and a top member 664. The conduits 634*a* and 636*a* recirculate an absorbent through the unit 662*a*, while conduits 640*a* and 642*a* feed nitrogen-rich waste water to and withdraw nitrogen-lean water from the unit 662*a*. Similarly, the conduits 634*b* and 636*b* recirculate an absorbent through the unit 662*b*, while conduits 640*b* and 642*b* feed nitrogen-rich waste water to and withdraw nitrogen-lean water from the unit 662*b*. Similarly, the conduits 634*c* and 636*c* recirculate an absorbent through the unit 662*c*, while conduits 640*c* and 642*c* feed nitrogen-rich waste water to and withdraw nitrogen-lean water from the unit 662*c*.

The section 610 and 660 also include inner walls 666, outer walls 668 and top walls 670. The denitrification units also include outer walls 672 and a top wall 673. The subsystem 600 also includes a bottom wall 674.

Figure 6C:
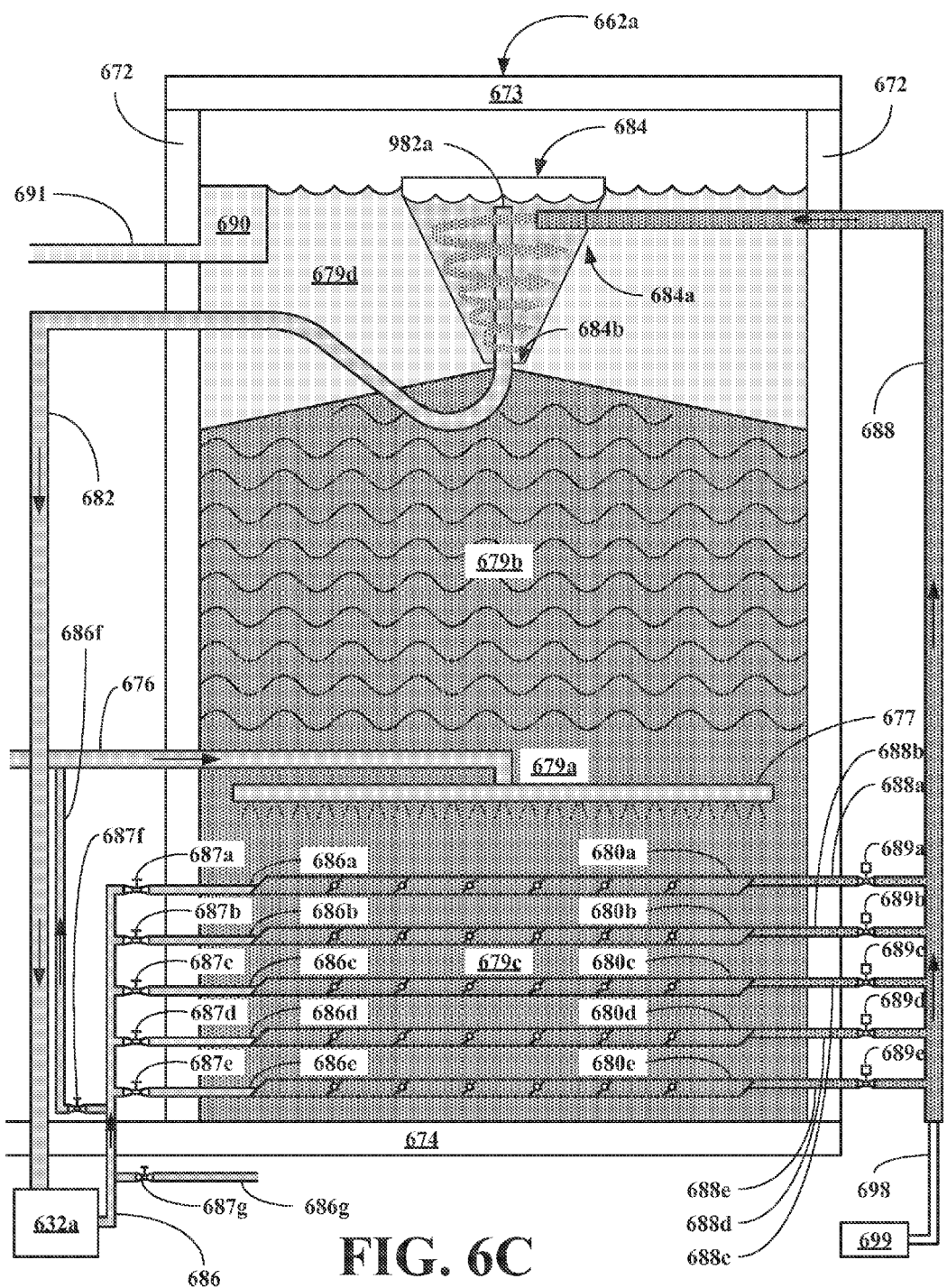
Figure 7A:
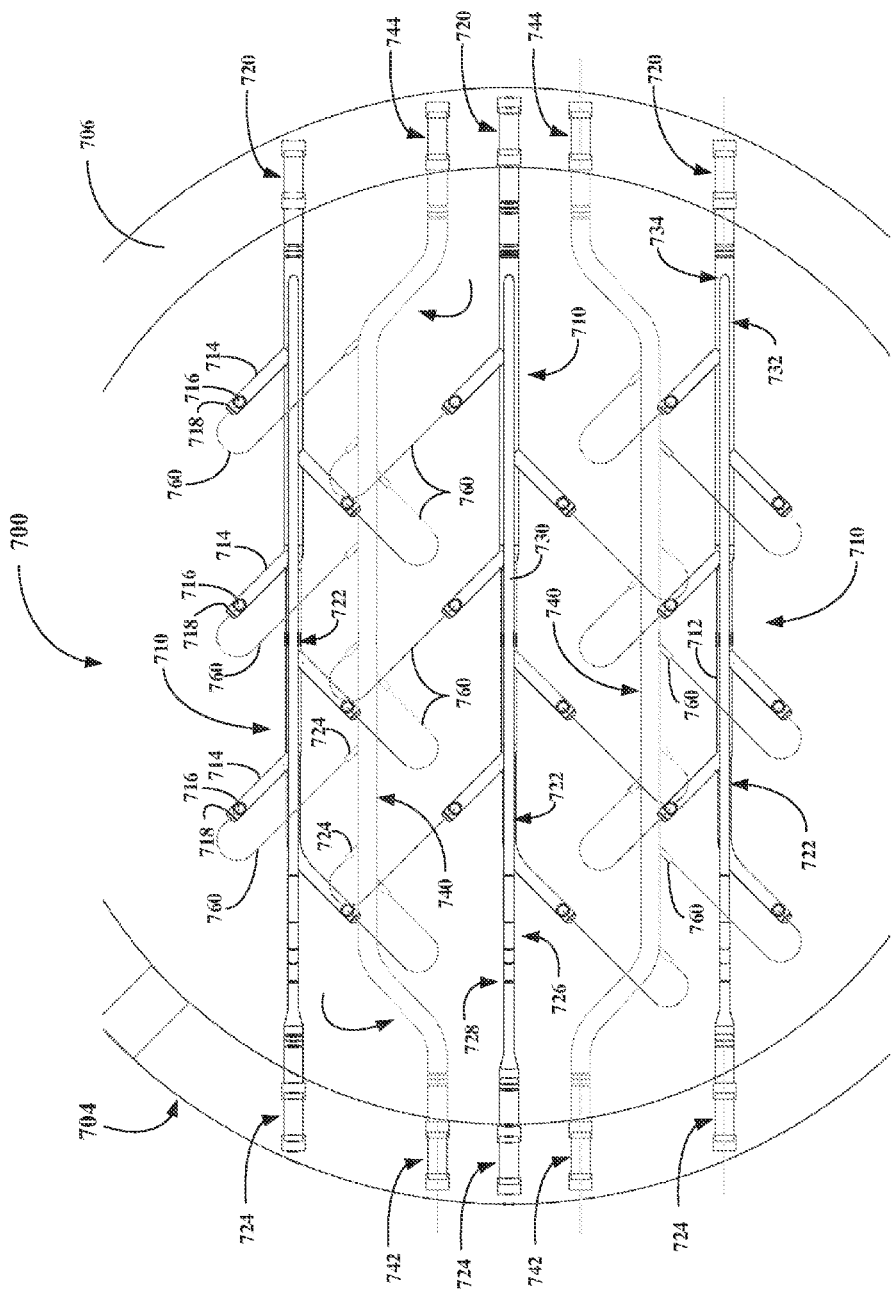
FIGS. 7A-I depict another embodiment of a denitrification subsystem of this invention.
Figure 7B:
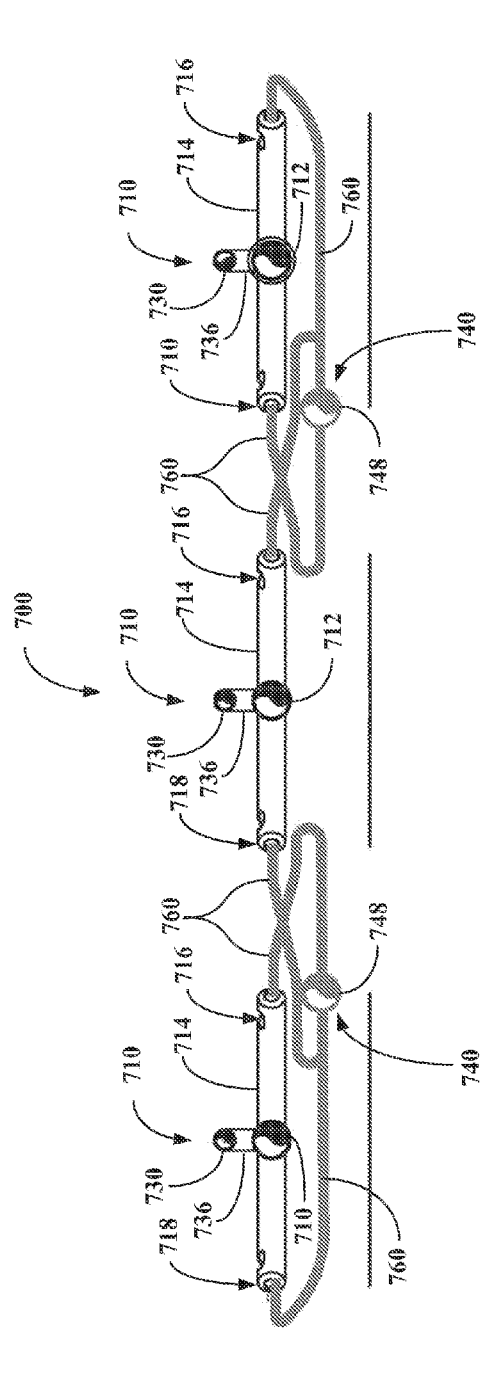
Figure 7C:
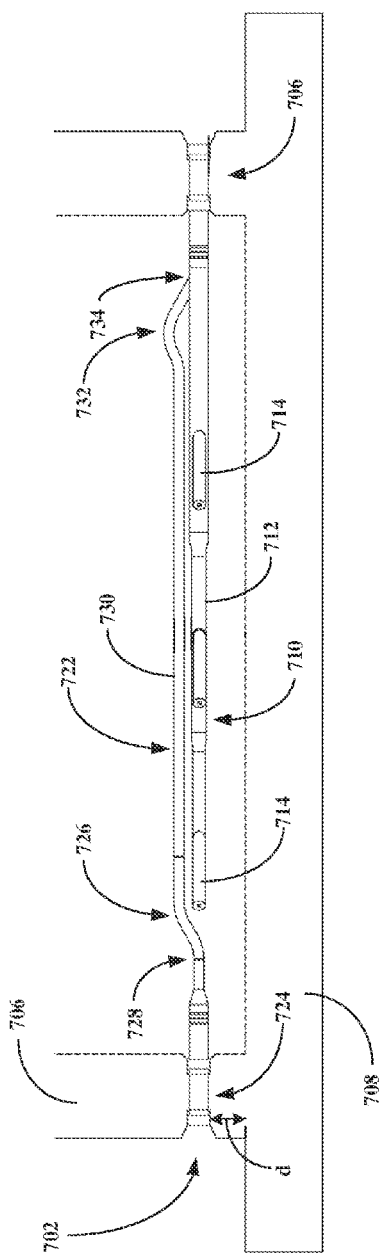
Figure 7D:
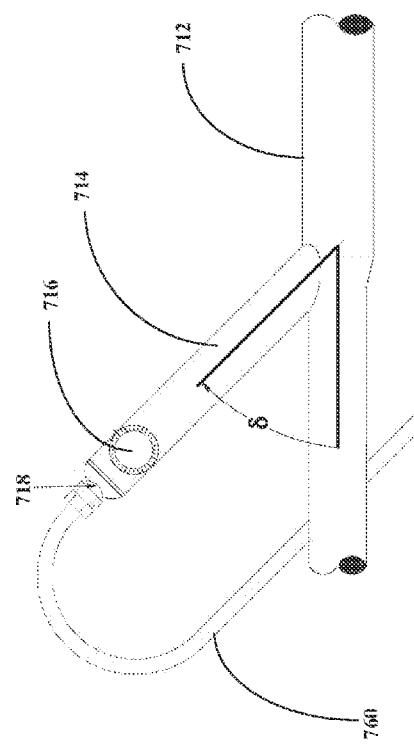
Figure 7E:
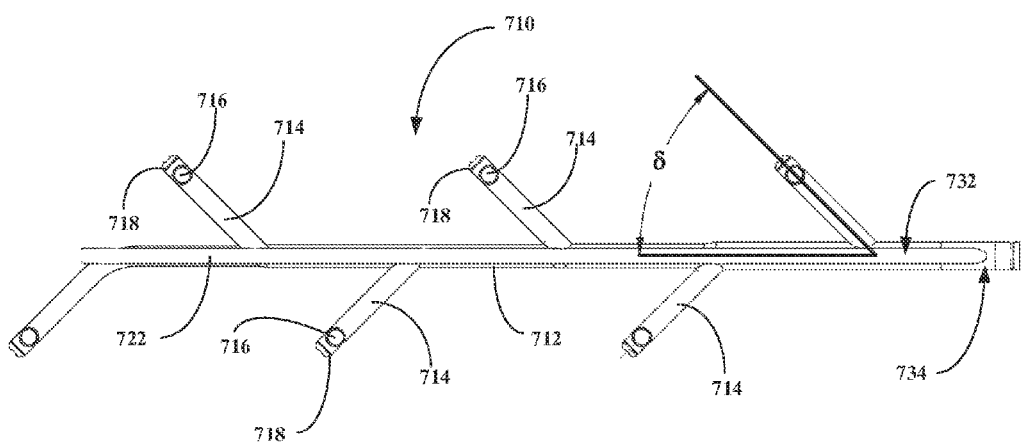
Figure 7F:
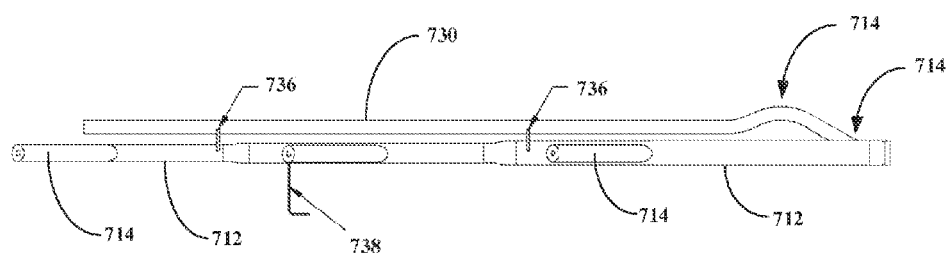
Figure 7G:
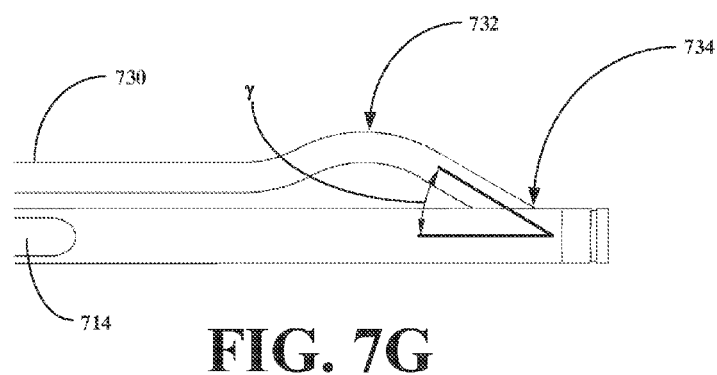
Figure 7H:
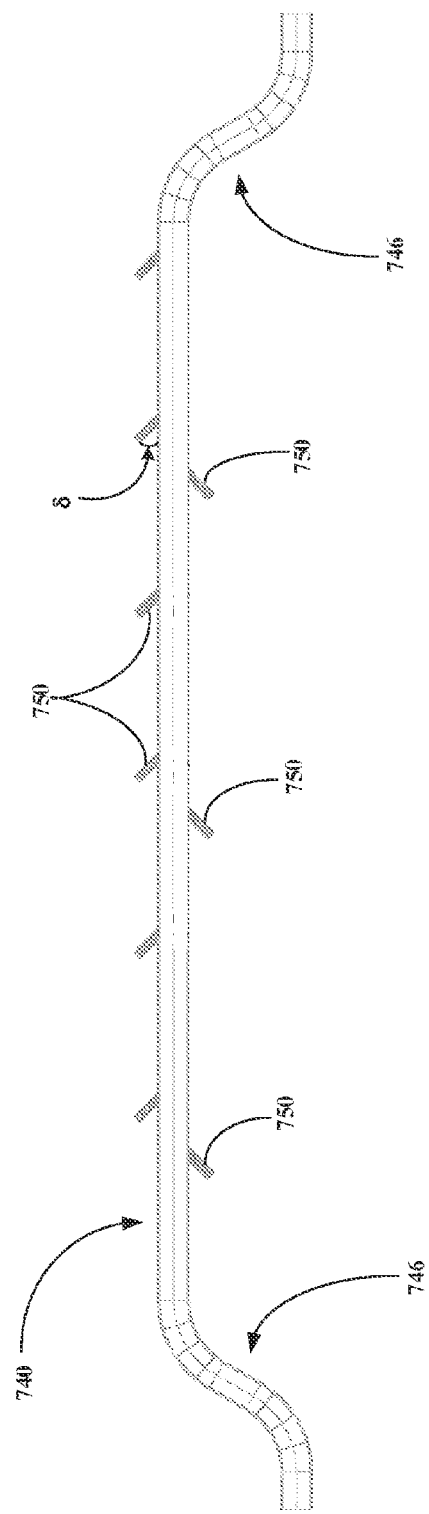
Figure 7I:
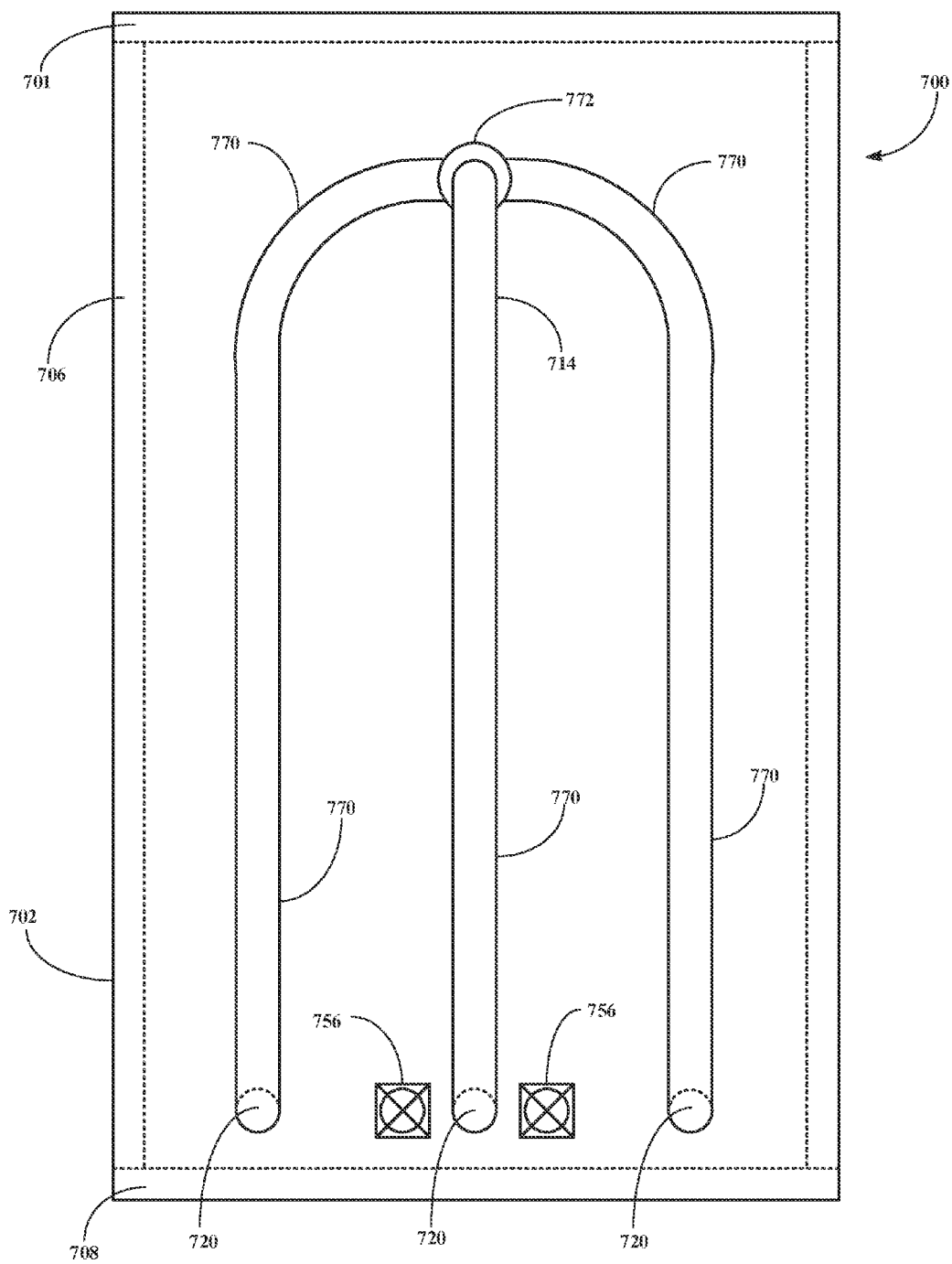

Referring now to FIG. 6C, the operation of the units 662*a-c* are described in conjunction with the details of the structure of the units 662*a-d*. Nitrogen rich waste water from the AR subsystem enters into the safe path 612 of the denitrification subsystem 600, the nitrogen-rich waste water is removed from the safe path 612 and pumped into the units 662*a-c* by the pump 638*a-c*, respectively. For the unit 662*a* (true for the other two), the nitrogen-rich, nutrient rich waste water is pumped through a nitrogen-rich waste water conduit 676 into a distributing header unit 677, where the nitrogen-rich waste water is introduced into a first absorption/denitrification zone or region 679*a* comprising a first absorbent/water/microbe mixture. In this zone, nitrogen species are absorbed into or onto the absorbent or absorbing media indicated by the dots. Depending on the oxygen content of the water entering the header 677, the zone 679*a* may be an aerobic zone, where aerobic microorganisms reduce the DO value to a value below about 0.04; otherwise, the zone 679*a* is an anoxic zone, but with evenly or uniformly distributed nutrients from the header 684. If the zone 679*a* is an anoxic zone, then nitrates/nitrites are actively converted to nitrogen gas by the action of microorganisms in the fluid inside the unit 662*a*. The distributing header unit 677 is designed to introduce the nitrogen-rich, nutrient-rich waste water into the zone 679*a* in an even or substantially even distribution or a uniform or substantially uniform distribution. This even or substantially even distribution or uniform or substantially uniform distribution is achieved through a pattern of holes and shape of the distributor 677 so that a flow through each hole is substantially identical. This even or uniform distribution insures that nutrients for the microbes are even or uniform distributed to reduce hot spots, dead spots or channeling of the water upward through the down flowing media. The nitrogen-rich, nutrient-rich waste water flows up as nitrates/nitrites are being absorbed and degraded to denitrify the water, while the media flows down so that the water and media form a counter-flow system.

As the media flow down past the header 677, the media enters a third zone 679*c*. The zone 679*c* is the respiratory inhibited zone, where microbial activity is substantially arrested. In this zone 679*c*, the media is collected and recirculated through a plurality of media collectors or inducers 680*a-e*, here five inducers are shown. In certain embodiments, the collectors or inducers 680*a-e* have different opening sizes, while in other embodiments, the collectors or inducers 680*a-e* have the same opening sizes. In the collectors or inducers 680*a-e*, the collected media is mixed with a recirculating flow of waste water, which enters the pump 632*a* via a recirculating conduit 682 having its end 682*a* centered in an ultra low pressure drop three phase separating hydrocyclone 684. The pump 632*a* pumps the recirculating flow into a recirculation exit conduit 686. The exit conduit 686 is divided into five inducer inlet conduits 686*a-e*, a shunt conduit 686*f* and a rejection conduit 686*g*. Fluid flows through the inducer inlet conduits 686*a-e*, the shut conduit 686*f* and the rejection conduit 686*g* are controlled by valves 687*a-g*. The recirculating fluid flowing through the inducers 680*a-e*, sweeps the collected media out of the inducers 680*a-e* and into outlet conduits 688*a-e*, which are combined into a medium return conduit 688. Fluid flow through the outlet conduits 688*a-e* is controlled by valves 689*a-e*. The flow rate of fluid through the inducers 680*a-c* is sufficient to dislodge dead microbes and weakly bound microbial films disposed on the surface of the media, but insufficient to reduce the particle size of the friable media to minimal extent. The conduit 688 can optionally include an aeration conduit 698 connected to an aeration unit 699. The rejection stream flowing through the conduit 686*g* is forwarded to a caustic lysing process, in this case to the precipitation subsystem 302.

The conduit 688 terminates in an upper part 684*a* of the hydrocyclone 684. In the hydrocyclone 684, the media stream mixes with clean water from a clean water zone 679*d* as the action of the hydrocyclone 684 separates the media from the water and the dead and weakly bound microbes and microbial films. The recirculating media then flows out of the hydrocyclone 684 through an hydrocyclone exit 684*b*, where the media is distributed in a second and an anoxic zone or region 679*b*, comprising a second absorbent/water/microbe mixture, where nitrogen species are absorbed into or onto the absorbent or absorbing media indicated by the dots and the nitrogen species are converted to nitrogen gas by the action of microorganisms in the water in this zone 679*b*. Nitrogen-lean water accumulates in the fourth zone 679*d*. Cleaned water is withdrawn from the unit 662*a* in the nitrogen-lean region 679*d* through an exit trough 690 connected to a nitrogen-lean water exit conduit 691. The two absorbing and denitrification regions 679*a-b* are designed to absorb and to convert nitrogen species into nitrogen gas. The resulting nitrogen-lean water exiting through the conduit 691 contains nitrogen concentration less than or equal to ($\leq$) about 20 ppm. In certain embodiments, the nitrogen concentration is less than or equal to ($\leq$) about 15 ppm. In certain embodiments, the nitrogen concentration is less than or equal to ($\leq$) about 10 ppm. In other embodiments, the nitrogen concentration is less than or equal to ($\leq$) about 5 ppm. In certain embodiments, the nitrogen concentration is less than or equal to ($\leq$) about 4 ppm. In certain embodiments, the nitrogen concentration is less than or equal to ($\leq$) about 3 ppm. In certain embodiments, the nitrogen concentration is less than or equal to ($\leq$) about 2 ppm. In certain embodiments, the nitrogen concentration is less than or equal to ($\leq$) about 1 ppm. In certain embodiments, the nitrogen concentration is less than or equal to ($\leq$) about 0.5 ppm. In certain embodiments, the nitrogen concentration is less than or equal to ($\leq$) about 0.4 ppm. In certain embodiments, the nitrogen concentration is less than or equal to ($\leq$) about 0.1 ppm.

Fourth Embodiment

Referring now to FIGS. 7A-I, an embodiment of the media collection and lift subsystem, generally 700, is shown to include three media lift headers 710, two inducer feed headers 740 and eighteen conduits 760 mounted in a third zone 702 of a denitrification unit 704. Each media lift header 710 includes a straight stem 712 including six branches 714 distributed in a spaced apart and side to side configuration down a length of the stem 712. Each branch 714 includes a funneled shaped aperture 716 and an inducer 718. Each media lift header 710 includes an output manifold 720. Each media lift header 710 also includes a flush line 722 having an input manifold 724. The flush line 722 includes an S-bend 726 at a first location 728 near the input manifold 716 so that a straight segment 730 of the flush line 722 is disposed above the stem 712. The flush line 722 include a second bend 732 at a second location 734 near the output manifold 720, which angles upward and then downward until it ties into the stem 712 at the second location 734 near the output manifold 720. The second bend 732 is angled downward by an angle γ as set forth above. The branches 714 are angled with respect to the stem 712 by the angle δ as set forth above. The straight segment 730 of the flush line 722 held in place by standoffs 736. The media lift headers 710 are held in place by brackets 738.

Each inducer feed header 740 includes an input manifold 742, an output manifold 744, two S-bends 746 and a straight segment 748 including nine nozzles 750 distributed in a spaced apart and side to side configuration down a length of the straight segment 748, with six nozzles on one side and three nozzles on the side. Each nozzle 750 extending out from the header 740 at the angle δ. The S-bends 746 occur at a first location 752 after the input manifold 742 and a second location 754 before the output manifold 744, where the S-bends 746 position the straight segment 748 between the lift headers 710 and below the lift headers 710 so that the conduits 760 extend up to the inducers 718 of the lift headers 710.

The conduits 760 connect the nozzles 750 of the feed header 740 to the inducers 710.

The manifolds 720, 724, 742 and 744 extend through an outer wall 706 of the unit 704 at a distance d about a bottom 708 of the unit 704. The feed header output manifolds 744 are equipped with valves 756 as are the input manifolds 720, 724 and 742 (not shown). The output manifolds 720 of the media lift headers 710 are connected to lift lines 770. The lift line 770 connect to a main line 772. The main line 772 feeds the hydrocyclone as previously described in the other embodiments. As is true in the embodiment of FIG. 6C, the embodiment of FIGS. 7A-I is capable of the same levels of reduction of nitrogen contaminants as if the case of the embodiment of FIG. 6C. The main difference between the embodiment of FIG. 6C is the medium collection subsystem in the lower zone of the denitrification units. The collection subsystem of FIG. 7A-I differs from the collection system of FIG. 6C in all of the collections openings are disposed in the same or substantially the same plane, while the collection system of FIG. 6C is a staged collections subsystem with collection openings disposed in stages down the length of the RI zone.

Detailed Description of Heating and Heat Transfer and Recovery Subsystem

Figure 8A:
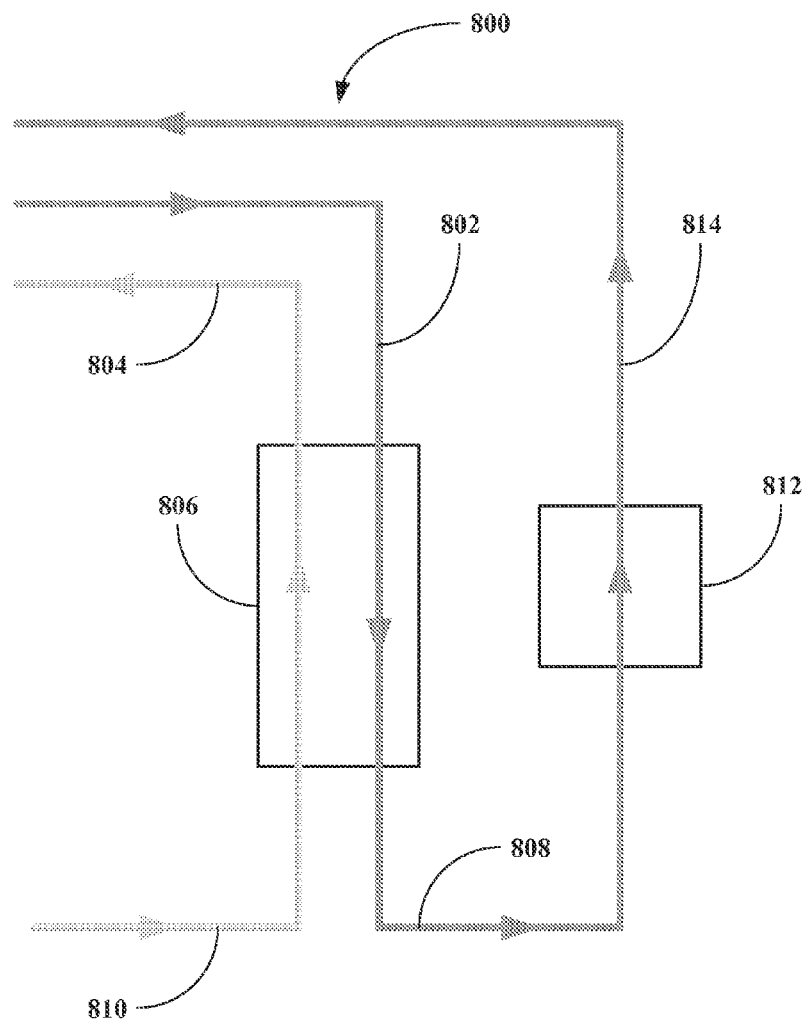
FIG. 8A depicts an embodiment of a heating, heat exchange or recovery subsystem of this invention.

Referring now to FIG. 8A, an embodiment of the heating, heat exchange and recovery subsystem, generally 800, is shown to include a cool ammonia rich waste water stream 802, which represents a portion of the effluent from the subsystem 400. The cool stream 802 is brought into heat exchange relationship with a warm ammonia stripped stream 804, which represents a portion of the ammonia stripped effluent stream. The streams 802 and 804 are brought into a counter flow relationship with each other in a heat exchanger or heat exchange zone 806. After passing through the heat exchanger 806, the cool stream 802 is heated to a heated ammonia rich stream 808 and the warm stream 804 is cooled to a cool ammonia stripped stream 810, which is returned to the AR subsystem 500. The heated ammonia rich stream 808 is then passed through a heater 812, where it is heated to its final temperature to form a hot ammonia rich stream 814, which is sent back to the AP subsystem 500 to raise a temperature of the subsystem 400 effluent to an optimal temperature for ammonia stripping. A flow rate of the water into and out of the heating, heat exchange and recovery subsystem 800 is controlled such that a temperature of the stream entering the stripper and absorber units is optimal for ammonia gas removal and ammonia gas recovery.

Figure 8B:
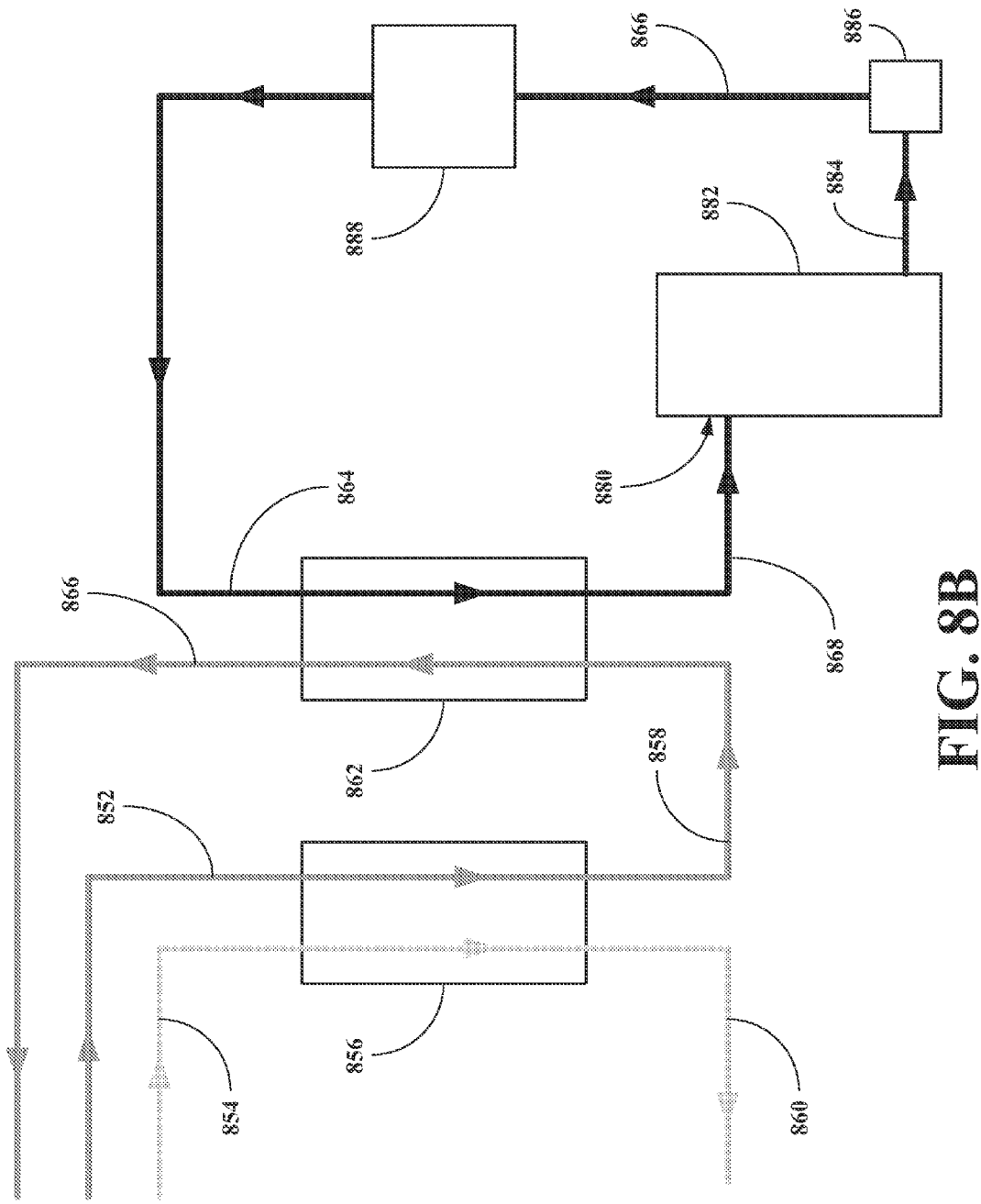
FIG. 8B depicts another embodiment of a heating, heat exchange or recovery subsystem of this invention.

Referring now to FIG. 8B, an embodiment of the heating, heat exchange and recovery subsystem, generally 850, is show to include a cool ammonia rich waste water stream 852, which represents a portion of the effluent from the subsystem 400. The cool stream 852 is brought into heat exchange relationship with a warm ammonia stripped stream 854, which represents a portion of the ammonia stripped effluent stream. The streams 852 and 854 are brought into a counter flow relationship with each other in a first heat exchanger or heat exchange zone 856. After passing through the first heat exchanger 856, the cool stream 852 is heated to form a heated ammonia rich stream 858 and the warm stream 854 is cooled to form a cool ammonia stripped stream 860, which is returned to the AR subsystem 500. The heated ammonia rich stream 858 is then passed through a second heat exchanger or heat exchange zone 862, where it is brought into heat exchange relationship with a hot heat exchange fluid stream 864. The streams 858 and 864 are brought into a counter flow relationship with each other in the second heat exchanger or heat exchange zone 862. After passing through the second heat exchanger 862, the heated stream 858 is heated to its final temperature to form a hot ammonia rich stream 866, which is sent back to the AP subsystem 500 to raise a temperature of the subsystem 400 effluent to an optimal temperature for ammonia stripping. A flow rate of the water into and out of the heating, heat exchange and recovery subsystem 800 is controlled such that a temperature of the stream entering the stripper and absorber units is optimal for ammonia gas removal and ammonia gas recovery.

After passing through the second heat exchange 862, the hot heat exchange fluid stream 864 forms a cooled heat exchange fluid stream 868. The cooled heat exchange fluid stream 868 is forwarded to an upper portion 870 of a heat exchange fluid reservoir 872. A recirculating stream 874 of the heat exchange fluid is pumped by a pump 876 and forwarded to heater 878, where its temperature is raised to a temperature sufficient to heat the stream 858 to its final temperature to form the stream 864.

Electrical Supply and Control

It should be recognized that all sensors, all pumps and all other equipment requiring electric energy to function is supplied through control panels (not shown) connected to a power distribution system. The control panel can include on site or remote control capabilities. If on site, then the control panel will be wired or wireless connected to a control room (not shown). Otherwise, the system can be controlled remotely either via an intranet or the internet.

Safe Path Description and Operation

The safe path of the present invention is primarily incorporated to overcome the reduced efficiencies of the traditional continuous stirred tank reactor (CNTR) designs and the lack of turndown capability in the plug flow reactor (PER) designs. Using reactor terminology, the safe path is a mixed feed attached reactor. The reduced efficiency arises from a lack of turndown capability in a plug flow reactor (PER) model. Using reactor terminology, the safe path is a mixed feed with attached reactors.

Referring now to FIGS. 9A-C, an embodiment of the system of this invention, generally 900, is shown to include a precipitation and conditioning stage 902, an ammonia stripping and neutralization stage 904, and a denitrification stage 906. The safe path 908 begins near the effluent 910 from the stage 902 and passes through the other two stages 904 and 906, sequentially. When all unit operations are off, the inflect flows through the safe path 908 continuously from the inflect to the effluent of the stages 902, 904 and 906 as shown in FIGS. 9A-C.

As shown in FIGS. 9A-C, inflect flows into the stages 904 and 906 through an opening 912 in the stage wall 914 as shown in FIGS. 9A-C. The momentum of the inflect flow carries it into an apparatus 916 called a momentum block shown in FIGS. 9D-G disposed in the safe path 918. If a stage 904 or 906 is off, pressure will increase in the momentum block 916 forcing the inflect to swirl out of the momentum block 916, flow around it and pass through the stage into the next downstream stage.

If a stage 904 or 906 is on, a recirculation pump 920 draws from the momentum block 916. If the recirculation pump 920 flow is greater than the incoming inflect flow, the pressure inside the momentum block 916 will lower causing water already in the stage to flow back into a space 922 between the inflect or safe path wall 924 and the momentum block 916, supplementing flow to the recirculation pump 920. This mixed flow is described schematically below in FIG. 10 to illustrate the calculations.

The momentum block 916 is shaped for efficient flow, but when placed against the safe path wall 924 is essentially a 3 sided box 926 with a hole 928 in its top 930. The hole 928 is designed to accept a pump suction tailpipe 932 in such a fashion as to allow top pull out maintenance and reassembly without being able to see the momentum block 916 as shown in FIG. 9D. FIG. 9E shows the safe path opening 934 before placement of the momentum block 916. FIG. 9F shows the momentum block 916 with a separation 936, in certain embodiments, the separation 936 is about 4½ inch, from the safe path wall 924 containing the safe path opening 934. FIG. 9F shows a fully assembled reactor feed pump assembly 938.

In the safe path configuration of this invention, all liquid entering the tank after the momentum block 916 is from an attached reactor, in this case a denitrification unit discharge. In the denitrification stage 906, because all safe path discharges are from the denitrification units in this area of the safe path, the safe path may be described as a plug flow tank; therefore, discharge may be mathematically modeled as a PER. The reactor treats a diluted feed like a CNTR model, except that the dilution is controlled because the reactor, the denitrification units, act as attached reactors to the safe path. In the safe path model, the size or volume of the tank (safe path sump) has no relationship to system performance in any steady-state calculation.

An Alternate Denitrification Embodiment

Figure 10:
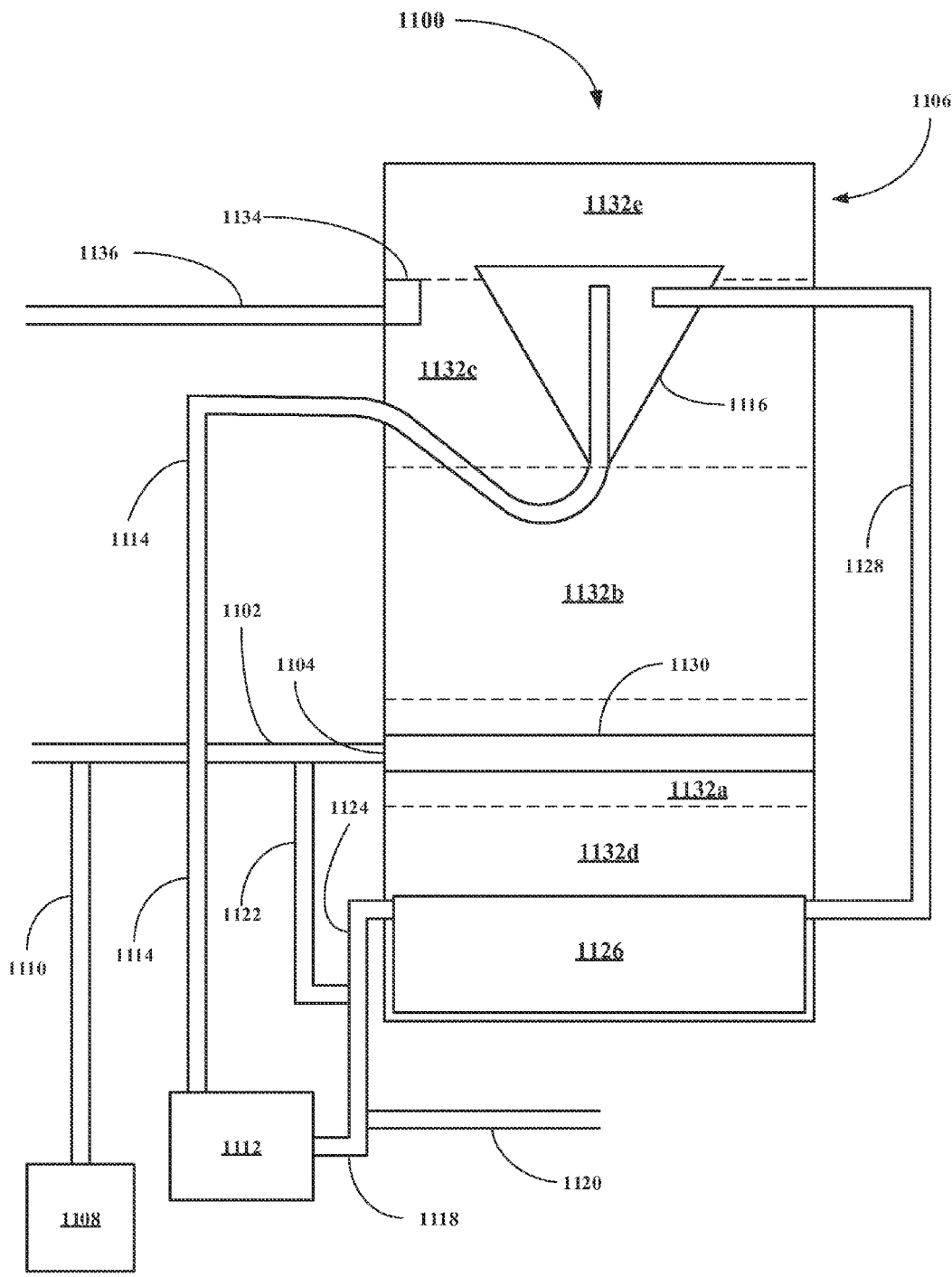
FIG. 10 depicts another embodiment of a denitrification subsystem of this invention.

Referring now to FIG. 10, an embodiment of a denitrification system, generally 1100, is shown to include a waste water inlet conduit 1102 connected to a waste water inlet 1104. The system 1100 uses an absorbent and microorganisms to absorb and convert nitrates and nitrites into nitrogen gas and consume ammonia/ammonium and/or other nitrogen-containing compound. The denitrification system 1100 includes at least one absorber/biological denitrification unit 1106. The unit 1106 includes microorganism and microorganism nutrients supply unit 1108 connected to the conduit 1102 via a microorganism/nutrient conduit 1110. The system 1100 can also include a supply of mineral acid (not show) to adjust the pH of the water to an optimal level and a heating unit (not shown) to adjust the temperature of the water to an optimal temperature. The unit 1106 includes media lift pump assemblies 1112 for recirculating water and media in a two loop configuration.

Recirculation water enters the pump 112 through conduit 1114, which originals in a central region of an ultra low pressure drop hydrocyclone 1116. The pump 112 pumps the recirculation water into an outlet conduit 1118. The outlet conduit 1118 is split into three conduits: a reject conduit 1120, a shut conduit 1122 and a recirculation conduit 1124. The reject conduit 1120 forwards biomass debris for process. The shut conduit 1122 sends part of the recirculation water into the raw water to improve nutrient utilization. The recirculation conduit 1124 is forwarded to an inducer or media lift subsystem 1126, where the water flow is used to sweep media collected in the inducer or media lift subsystem 1126 out through a media recirculation conduit 1128. The water flow into and out of the inducer or media lift subsystem 1126 is sufficient to lift the media for discharge into the ultra low pressure drop hydro cyclone 1116. The water flow in the inducer or media lift subsystem 1126 is sufficient to shear the media dislodging dead microbes and weakly bound microbial films from the media, but insufficient to reduce the particle size of the media to any appreciable extent, generally less than 0.05% of the particles undergo a reduction in size per cycle with the ultimate goal being less than 0.015% or no particles undergoing a reduction in size per cycle. Minimal reduction in size can be achieve through careful inducer design and water flow rate. The inducer has holes in the top through which the media are collected. The incoming water inlet 1104 is connected to a distributor 1130. The distributor 1130 include holes in its bottom which are patterned so that the incoming nitrogen-rich, microbial rich and nutrient rich water is evenly or uniformly distributed through the unit 1106 across a cross-section in a first zone 1132a. In the first zone 1132a, nutrient and water is evenly or uniformly distributed and, if present, oxygen is depleted through the action of aerobic microbes. As the water flow up and the oxygen contents is dropped below about 0.4 mg/L, an anoxic zone 1132b is produced, where the microbes degrade nitrate and nitrites to nitrogen gas. As the water continues to rise, denitrified water accumulates in a clear water zone 1132c and is exits the unit 1106 through a trough 1134, which is connected to an outlet conduit 1136. As the media enter the hydrocyclone 1116, clean water from the zone 1132c is pulled into a bottom of the hydrocyclone 1116 cleaning the media of the dislodged debris. As the media falls through the denitrification zone 1132b, microbes degrade nitrate and/or nitrites from the water and from any adsorbed or absorbed nitrates/nitrites in the media. As the media fall past the distributor 1130 and out of the zone 1132a, the media enters a respiratory inhibited zone 1132d, where microbial activity is arrested. The media is then collected in the inducer 1126 and recirculated. The final zone 1132e in the unit 1106 is a head space filled with gas.

Another Alternate Denitrification Embodiment

Figure 11A:
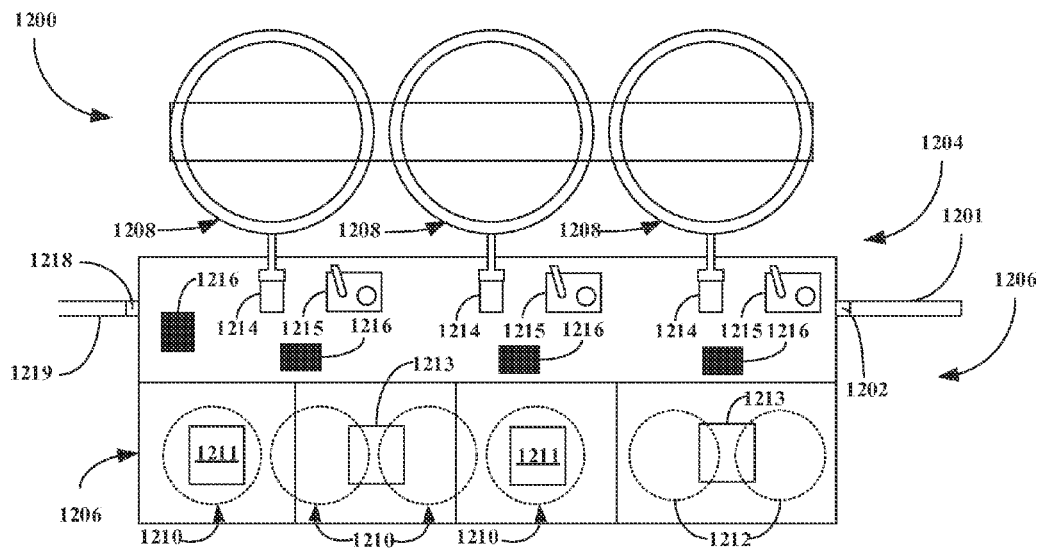
FIGS. 11A&B depicts embodiment of a denitrification subsystem of this invention.

Referring now to FIG. 11A, a denitrification system 1200 includes at an inlet 1202 connected to an inlet conduit 1201, where the system is designed to use an absorbent and microorganisms or microbes to absorb and convert nitrates, nitrites, residual ammonia/ammonium, or other nitrogen-containing compound into nitrogen gas or amino acids through biosynthesis. The denitrification subsystem 1200 includes an absorber/biological denitrification section 1204 and a nutrient supply section 1206. The absorber/biological denitrification section 1204 includes a plurality of absorber/biological denitrification units 1208. The nutrient supply section 1206 includes microorganism nutrients tanks 1210 and associated hatches 1211 for filling the tanks 1210. The nutrient supply section 1206 also includes mineral acid tanks 1212 and associated hatches 1213 for filling the tank. The mineral acid is used in the AR subsystem and in the denitrification subsystem. In the AR subsystem, the mineral acid is used to convert ammonia gas into the ammonium mineral acid salt liquor. In the denitrification subsystem, the mineral acid is used to adjust the pH to the optimal pH for supporting the microorganisms used to convert nitrogen-containing oxide, residue ammonia and other species into nitrogen gas. The denitrification section 1204 includes media lift pump assemblies 1214 for supplying waste water to the units 1208 and recirculation pump assemblies 1215 for supplying nutrients to the units 1208. The denitrification section 1204 also includes access hatches 1216. The denitrification subsystem 1200 includes an outlet 1218 connected to a finished effluent conduit 1219.

Figure 11B:
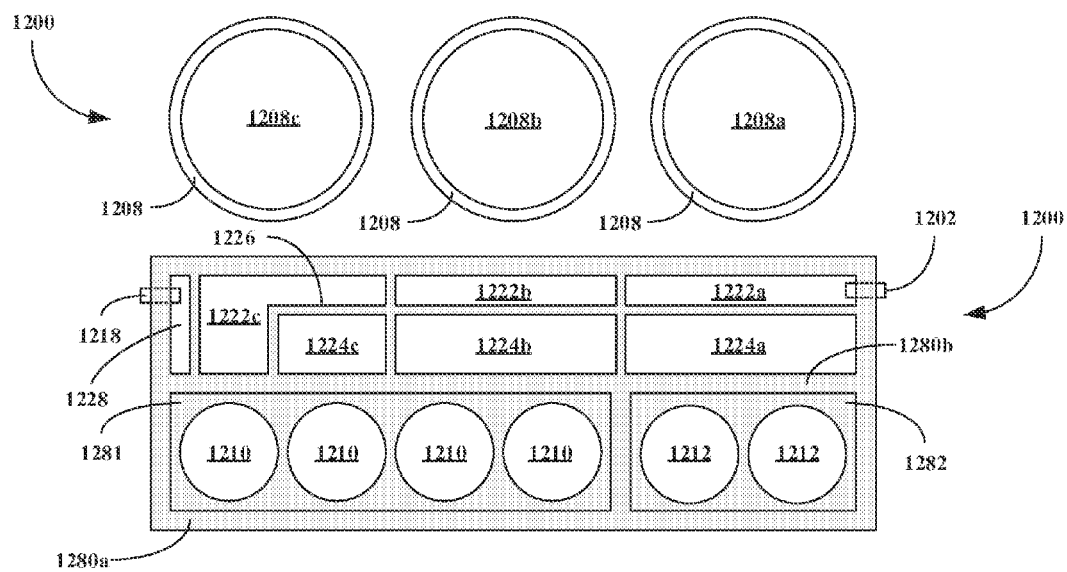

Referring now to FIG. 11B, the denitrification subsystem 1200 includes outer and inner walls 1220a&b. The subsystem 1200 also includes a nutrient enclosure 1221 of the nutrient section 1206 housing the nutrient tanks 1210 and a mineral acid enclosure 1222 of the nutrient section 1206 housing the mineral acid tanks 1212. The subsystem 1200. The subsystem 1200 also includes safe paths 1222a-c, one for each absorber/biological denitrification section 1208. The paths 1222a-c are associated with the recirculation pump assemblies 1215. The subsystem 1200 also includes auxiliary paths 1224a-c with overflow walls 1226 for use with an optional final treatment subsystem (not shown) if needed to bring the denitrified water into final compliance with appropriate federal, state and local governmental regulations or to allow water to de-aerate as the water is discharged from the units 1208. In certain embodiments, the unit discharge is a partially spiral discharge line that mixes the discharge water with air. The system 1200 also includes a discharge enclosure/reservoir 1228 connected to the outlet 1218.

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

We claim:

1. A method for treating waste water comprising:
supplying a waste water via an inlet of a denitrification system including a bio-denitrification unit to establish a fixed volume flow of the waste water through the denitrification system referred to as a safe path,
withdrawing a portion of the waste water from the safe path through a momentum block disposed in the safe path;
introducing a regenerated particulate adsorbent/absorbent slurry into an upper section of the bio-denitrification unit of the denitrification system through a slurry introduction apparatus,
introducing the withdrawn waste water, an amount of a microbe carbon food source and an amount microbe micro-nutrients into the bio-denitrification unit through a distributor disposed in a lower middle section of the bio-denitrification unit, where the withdrawn waste water, food source and micro-nutrients are added at a rate sufficient to establish a counter-flow, anoxic expanded bed zone of the particulate adsorbent/absorbent between a location below the distributor and an outlet of the slurry introduction apparatus, where the withdrawn waste water flows up through the zone and the particulate adsorbent/absorbent flows down through the zone, the particulate adsorbent/absorbent adsorbs and/or absorbs nitrogen-containing compounds in the waste water, the microbes degrade the nitrogen-containing compounds into nitrogen gas or amino acids via bio-synthesis, the microbes control a dissolved oxygen (DO) level in the medium and the microbes utilize any residual or formed ammonia in bio-synthesis,
regenerating the particulate adsorbent/absorbent via bio-denitrification of the adsorbed and/or absorbed nitrogen-containing compounds in the counter-flow, anoxic expanded bed zone and in a co-flow, respiratory inhibited zone disposed below the anoxic zone to form a regenerated particulate adsorbent/absorbent slurry;
collecting the regenerated particulate adsorbent/absorbent slurry through a plurality of collection apertures in a slurry collection assembly;
withdrawing a recirculation water from a recirculation water outlet disposed in an upper portion of the slurry input apparatus;
supplying a portion of the recirculation water to inducer apertures of the slurry collection assembly, where an inducer aperture is associated with each collection aperture and where the water is sufficient to induce and transport the slurry through the slurry collection assembly,
uplifting the induced, regenerated particulate adsorbent/absorbent slurry in a slurry uplift assembly, where the slurry includes a sufficient amount of viable bacteria to re-populate the bacteria to a denitrification level;
overflowing a purified waste water from an outlet trough disposed in a purified water zone of the bio-denitrification unit, where the purified waste water has a nitrogen content of no more than 10 ppm,
returning the purified waste water to the safe path to form a denitrified water, and
discharging the denitrified water from a system outlet.

2. The method of claim 1, wherein the denitrified water has a nitrogen content of no more the 5 ppm.

3. The method of claim 1, wherein the denitrified water has a nitrogen content of no more the 3 ppm.

4. The method of claim 1, wherein the denitrified water has a nitrogen content of no more the 1 ppm.

5. The method of claim 1, wherein the denitrified water has a nitrogen content of no more the 0.5 ppm.

6. The method of claim 5, wherein the denitrified water has a nitrogen content of no more the 0.1 ppm.

7. The method of claim 1, further comprising:
measuring a first dissolved oxygen level at the distributor,
measuring a second dissolved oxygen level at the slurry collection assembly, and
controlling the food source and micro-nutrients based on values of the first and second dissolved oxygen levels.

8. The method of claim 7, wherein if the first dissolved oxygen level is above 0.19 mg/L, increasing the carbon food source and micro-nutrients introduced with the second treated waste water and if the second dissolved oxygen level is below about 0.12 mg/L reducing carbon food source and micro-nutrients introduced with the second treated waste water.

9. The method of claim 1, wherein the denitrification system includes a plurality of bio-denitrification units and
the method further comprises:
sequentially withdrawing a portion of the waste water from the safe path through a momentum block associated with each bio-denitrification unit disposed in the safe path;
sequentially introducing a regenerated particulate adsorbent/absorbent slurry into an upper section of each of the bio-denitrification units of the denitrification system through a slurry introduction apparatus, sequentially introducing the withdrawn waste water, an amount of a microbe carbon food source and an amount microbe micro-nutrients into each of the bio-denitrification units through a distributor disposed in a lower middle section of the bio-denitrification unit, where the withdrawn waste water, food source and micro-nutrients are added at a rate sufficient to establish a counter-flow, anoxic expanded bed zone of the particulate adsorbent/absorbent between a location below the distributor and an outlet of the slurry introduction apparatus, where the withdrawn waste water flows up through the zone and the particulate adsorbent/absorbent flows down through the zone, the particulate adsorbent/absorbent adsorbs and/or absorbs nitrogen-containing compounds in the waste water, the microbes degrade the nitrogen-containing compounds into nitrogen gas or amino acids via bio-synthesis, the microbes control a dissolved oxygen (DO) level in the medium and the microbes utilize any residual or formed ammonia in bio-synthesis, sequentially regenerating the particulate adsorbent/absorbent via bio-denitrification of the adsorbed and/or absorbed nitrogen-containing compounds in the counter-flow, anoxic expanded bed zone and in a co-flow, respiratory inhibited zone disposed below the anoxic zone to form a regenerated particulate adsorbent/absorbent slurry;

sequentially collecting the regenerated particulate adsorbent/absorbent slurry through a plurality of collection apertures in a slurry collection assembly;

sequentially withdrawing a recirculation water from a recirculation water outlet disposed in an upper portion of the slurry input apparatus;

sequentially supplying a portion of the recirculation water to inducer apertures of the slurry collection assembly, where an inducer aperture is associated with each collection aperture and where the water is sufficient to induce and transport the slurry through the slurry collection assembly, sequentially uplifting the induced, regenerated particulate adsorbent/absorbent slurry in a slurry uplift assembly, where the slurry includes a sufficient amount of viable bacteria to re-populate the bacteria to a denitrification level;

sequentially overflowing a purified waste water from an outlet trough disposed in a purified water zone of each of the bio-denitrification units, where the purified waste water has a nitrogen content of no more than 10 ppm, and sequentially returning the purified waste water to the safe path to form a denitrified water.

* * * * *